US010953385B2

(12) United States Patent
Long et al.

(10) Patent No.: US 10,953,385 B2
(45) Date of Patent: Mar. 23, 2021

(54) OVERCOMING TWO CARBON DIOXIDE ADSORPTION STEPS IN DIAMINE-APPENDED METAL-ORGANIC FRAMEWORKS

(71) Applicants: The Regents of the University of California, Oakland, CA (US); ExxonMobil Research and Engineering Company, Annandale, NJ (US)

(72) Inventors: Jeffrey R. Long, Oakland, CA (US); Simon Christopher Weston, Annandale, NJ (US); Phillip J. Milner, Albany, CA (US); Jeffrey D. Martell, Berkeley, CA (US); Rebecca L. Siegelman, Berkeley, CA (US)

(73) Assignees: The Regents of the University of California, Oakland, CA (US); ExxonMobil Research and Engineering Company, Annandale, NJ (US)

( * ) Notice: Subject to any disclaimer, the term of this patent is extended or adjusted under 35 U.S.C. 154(b) by 34 days.

(21) Appl. No.: 16/045,616

(22) Filed: Jul. 25, 2018

(65) Prior Publication Data
US 2019/0060867 A1 Feb. 28, 2019

Related U.S. Application Data

(60) Provisional application No. 62/541,623, filed on Aug. 4, 2017.

(51) Int. Cl.
*B01J 20/22* (2006.01)
*B01J 31/16* (2006.01)
(Continued)

(52) U.S. Cl.
CPC ............ *B01J 20/226* (2013.01); *B01D 53/02* (2013.01); *B01D 53/62* (2013.01); *B01D 53/82* (2013.01);
(Continued)

(58) Field of Classification Search
None
See application file for complete search history.

(56) References Cited

U.S. PATENT DOCUMENTS 5,777,023 A * 7/1998 Pavlin ................ C08G 18/3825
106/31.29

FOREIGN PATENT DOCUMENTS

| WO | WO 2015/164543 A1 | 10/2015 |
| WO | WO 2017/059130 A2 | 4/2017 |
| WO | WO 2018/152438 A1 | 8/2018 |

OTHER PUBLICATIONS

International Search Report and Written Opinion for International Application No. PCT/US2018/043775 dated Oct. 24, 2018, 16 pages.
(Continued)

*Primary Examiner* — Daniel Berns
(74) *Attorney, Agent, or Firm* — Morgan, Lewis & Bockius LLP

(57) ABSTRACT

Primary, secondary (1°,2°) alkylethylenediamine- and alkylpropylenediamine-appended variants of metal-organic framework are provided for $CO_2$ capture applications. Increasing the size of the alkyl group on the secondary amine enhances the stability to diamine volatilization from the metal sites. Two-step adsorption/desorption profiles are overcome by minimizing steric interactions between adjacent ammonium carbamate chains. For instance, the isoreticularly expanded framework $Mg_2$(dotpdc) ($dotpdc^{4-}$=4,4"-dioxido-[1,1':4',1"-terphenyl]-3,3"-dicarboxylate), yields diamine-appended adsorbents displaying a single $CO_2$
(Continued)

adsorption step. Further, use of the isomeric framework Mg-IRMOF-74-II or Mg$_2$(pc-dobpdc) (pc-dobpdc$^{4-}$=3,3-dioxidobiphenyl-4,4-dicarboxylate, pc=para-carboxylate) also leads to a single CO$_2$ adsorption step with bulky diamines. By relieving steric interactions between adjacent ammonium carbamate chains, these frameworks enable step-shaped CO$_2$ adsorption, decreased water co-adsorption, and increased stability to diamine loss. Variants of Mg$_2$(dotpdc) and Mg$_2$(pc-dobpdc) functionalized with large diamines such as N-(n-heptyl)ethylenediamine have utility as adsorbents for carbon capture applications.

26 Claims, 19 Drawing Sheets

(51) Int. Cl.

| | | |
|---|---|---|
| *B01J 20/28* | (2006.01) | |
| *B01D 53/02* | (2006.01) | |
| *B01D 53/62* | (2006.01) | |
| *B01D 53/82* | (2006.01) | |
| *B01D 53/96* | (2006.01) | |
| *C07F 3/02* | (2006.01) | |
| *C10L 3/10* | (2006.01) | |
| *B01D 53/047* | (2006.01) | |
| *B01D 53/04* | (2006.01) | |
| *B01J 20/34* | (2006.01) | |

(52) U.S. Cl.
CPC ......... *B01D 53/96* (2013.01); *B01J 20/28011* (2013.01); *B01J 20/28066* (2013.01); *B01J 31/1691* (2013.01); *C07F 3/02* (2013.01); *C10L 3/104* (2013.01); *B01D 53/047* (2013.01); *B01D 53/0462* (2013.01); *B01D 53/0476* (2013.01); *B01D 2252/204* (2013.01); *B01D 2253/204* (2013.01); *B01D 2253/25* (2013.01); *B01D 2253/306* (2013.01); *B01D 2256/245* (2013.01); *B01D 2257/504* (2013.01); *B01D 2258/0283* (2013.01); *B01D 2258/05* (2013.01); *B01J 20/3425* (2013.01); *B01J 20/3483* (2013.01); *B01J 20/3491* (2013.01); *C10L 2290/542* (2013.01)

(56) References Cited

OTHER PUBLICATIONS

Siegelman, R. et al., "Controlling Cooperative CO2 Adsorption in Diamine-Appended Mg 2 (dobpdc) Metal-Organic Frameworks," Journal of the American Chemical Society, vol. 139, No. 30, Jul. 19, 2017, pp. 10526-10538.
Milner, P. et al., "Overcoming double-step CO2 adsorption and minimizing water co-adsorption in bulky diamine-appended variants of Mg 2 (dobpdc)", Chemical Science, vol. 9, No. 1, Jan. 1, 2018, pp. 160-174.
Bacsik et al., 2011, Langmuir 27, p. 11118.
Bae et al., 2009, Chem. Mater. 21, p. 4768.
Bhatt et al., 2016, J. Am. Chem. Soc. 138, p. 9301.
Bhown and Freeman, 2011, Environ. Sci. Technol. 45, p. 8624.
Boot-Handford et al., 2014, Energy Environ. Sci. 7, p. 13.
Bourrelly et al., 2005, J. Am. Chem. Soc. 127, p. 13519-13521.
Canivet et al., 2014, Chem. Soc. Rev. 43, p. 5594.
Cao et al., 2013, J. Environ. Sci. 25, p. 2081.
Chen et al., 2013, Chem. Commun. 49, p. 6846.
Choi et al., 2009, ChemSusChem, 2, p. 796.
Chu, 2009, Science 325, p. 1599.
D'Alessandro et al., 2010, Angew. Chem. Int. Ed., 49, p. 6058.
Deng et al., 2012, Science 336, p. 1018.
Didas et al., 2014, J. Phys. Chem. Lett. 5, 23, p. 4194.
Drage, 2012, J. Mater. Chem. 22, p. 2815.
Drisdell et al., 2015, Phys Chem Chem Phys 17, p. 21448.
Eddaoudi et al., 2002, Science 295, p. 469.
Elsaidi et al., 2015, Chem. Commun. 51, p. 15530.
Fernandez et al., 2015, Dalton Trans. 44, p. 13490.
Fracaroli et al., 2014, J. Am. Chem. Soc. 136, p. 8863.
Fracaroli et al., 2016, J. Am. Chem. Soc. 138, p. 8352.
Franchi et al., 2005, Ind. Eng. Chem. Res. 44, 21, p. 8007-8013.
Fredriksen and Jens, 2013, Energy Procedia 37, p. 1770.
Furukawa et al., 2013, Science 341, p. 123044.
Gouedard et al., 2012, Int. J. Greenhouse Gas Control, 10, p. 244.
Gygi et al., Chem. Mater. 28, p. 1128.
Haszeldine, 2009, Science 325. p. 1647.
Ichikawa et al., 2016, Langmuir 32, p. 9722.
Jo et al., 2017, ChemSusChem 10, p. 541.
Kapelewski et al., 2014, J. Am. Chem. Soc., 136, p. 12119.
Kim et al., 2016, Energy Environ. Sci. 9, p. 1803.
Kondo et al., 2007, J. Am. Chem. Soc. 129, p. 12362.
Lee and Park, 2015, Ind. Eng. Chem. 23, p. 1.
Lee et al., 2014, Energy Environ. Sci. 7, p. 744.
Lee et al., 2015, Chem. Sci. 6, p. 3697.
Li et al., 2011, Coord. Chem. Rev. 255, p. 1791.
Liao et al., 2016, Chem. Sci. 7, p. 6528.
Lin et al., 2016, RSC Adv. 6, p. 32598.
Liu et al., 2012, Chem. Soc. Rev. 41, p. 2308.
Liu et al., 2012, Greenhouse Gases Sci. Technol. 2, p. 239.
Mason et al., 2011, Energy Environ. Sci. 4, p. 3030.
Mason et al., 2015, J. Am. Chem. Soc. 137, p. 4787.
McDonald et al., 2015, Nature 519, p. 303.
McDonald et al., 2012, J. Am. Chem. Soc. 134, p. 7056.
Montoro et al., 2012, J. Mater. Chem. 22, p. 10155.
Nelson et al., 2009, J. Am. Chem. Soc. 131, p. 458.
Nguyen and Cohen, 2010, J. Am. Chem. Soc. 132, p. 4560.
Nugent et al., 2013, Nature 495, p. 80.
Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014.
Park and Suh, 2010, Chem. Commun. 46, 610.
Planas et al., 2013, "The Mechanism of Carbon Dioxide Adsorption in an Alkylamine-Functionalized Metal-Organic Framework," J. Am. Chem. Soc. 135, pp. 7402-7405.
Qiao et al., 2016, Chem. Commun. 52, p. 974.
Quadrelli et al., 2007, "The energy-climate challenge: Recent trends in CO2 emissions from fuel combustion," Energy Policy 35, pp. 5938-5952.
Rochelle, 2009 Science 325, p. 1652.
Sabouni et al., 2014, Environ. Sci. Pollut. Res. 21, p. 5427.
Salles et al., 2010, J. Am. Chem. Soc. 132, p. 13782.
Samanta et al., 2012, Ind. Eng. Chem. Res. 51, p. 1438.
Sanda et al., 2013, Inorg. Chem. 52, p. 12866.
Sayari and Belmabkhout, 2010 J. Am. Chem. Soc. 132, p. 6312.
Serna-Guerrero et al., 2008, Ind. Eng. Chem. Res. 47, 9406.
Sumida et al., 2012, Chem. Rev. 112, p. 724.
Tanabe and Cohen, 2011, Chem. Soc. Rev. 40, p. 498.
Taylor et al., 2016, J. Am. Chem. Soc. 138, p. 15019.
Ünveren et al., 2017, Petroleum 3, p. 37.
Veneman et al., 2014, Energy Procedia 63, p. 2336.
Wang and LeVan, 2010, J. Chem. Eng. Data 55, p. 3189.
Woerner, et al., 2016, J. Phys. Chem. C 120, p. 360.
Wu et al., 2015, Dalton Trans. 44, p. 10141.
Xiao et al., 2016, J. Am. Chem. Soc. 138, p. 14371.
Xu et al., 2005, Ind. Eng. Chem. Res. 44, p. 8113.
Yang et al., 2011, J. Am. Chem. Soc. 133, p. 18094.
Yu et al., 2017, Chem. Rev., (DOI: 10.1021/acs.chemrev.6b0062).
Zhou et al., 2012, Chem. Rev. 112, p. 673.

* cited by examiner

Mg$_2$(dobpdc)

dobpdc$^{4-}$ = n = 1: e-2    n = 4: nPent-2
n = 2: nPr-2  n = 5: nHex-2
n = 3: nBu-2  n = 6: nHept-2

R = H: i-2
R = Me: 3-Pent-2 cPent-2

OVERCOMING TWO CARBON DIOXIDE ADSORPTION STEPS IN DIAMINE-APPENDED METAL-ORGANIC FRAMEWORKS

FIELD OF THE PRESENT DISCLOSURE

This application claims priority to U.S. Provisional Application No. 62/541,623, entitled "OVERCOMING TWO $CO_2$ ADSORPTION STEPS IN DIAMINE-APPENDED METAL ORGANIC FRAMEWORKS," filed Aug. 4, 2017, which is hereby incorporated by reference.

FIELD OF THE PRESENT DISCLOSURE

The present application relates to adsorbents that enable effective capture of $CO_2$ at low partial pressures while being regenerable at moderate temperatures with a low regeneration energy for carbon capture applications.

BACKGROUND

Carbon dioxide ($CO_2$) generated from burning fossil fuels at thermoelectric power plants is likely a major contributor to global climate change. See, Pachauri and Meyer, Climate Change 2014: Synthesis Report. Contribution of Working Groups I, II and III to the Fifth Assessment Report of the Intergovernmental Panel on Climate Change, International Government Panel on Climate Change, Geneva, Switzerland, 2014. One strategy that has been proposed to minimize global $CO_2$ emissions is carbon capture and sequestration (CCS), in which the $CO_2$ is separated from the other constituents of flue gas (primarily $N_2$, $O_2$, and $H_2O$) before it is released into the atmosphere. See, Pachauri and Meyer, Id., Chu, 2009, Science 325, p. 1599, and Haszeldine, 2009, Science 325. p. 1647. The most technology-ready materials for CCS applications are aqueous amine solutions due to their low costs, effective performance under humid conditions, and high selectivity for $CO_2$ over $N_2$. See, Boot-Handford et al., 2014, Energy Environ. Sci. 7, p. 130; Bhown and Freeman, 2011, Environ. Sci. Technol. 45, p. 8624; and Rochelle, 2009 Science 325, p. 1652.

However, these sorbents suffer from a number of drawbacks, including low working capacities (~2 wt %), corrosiveness, and thermal degradation upon regeneration. See Boot-Handford, 2014, Fennell, Energy Environ. Sci. 7, p. 130; and Fredriksen and Jens, 2013, Energy Procedia 37, p. 1770; Gouedard et al., 2012, Int. J. Greenhouse Gas Control, 10, p. 244. In contrast, porous solids such as zeolites are more thermally stable than aqueous amines and possess potentially lower regeneration energies. See, Drage, 2012, J. Mater. Chem. 22, p. 2815. These favorable properties have led to their investigation as adsorbents for CCS. For selected reviews, see: Lee and Park, 2015, Ind. Eng. Chem. 23, p. 1; Samanta et al., 2012, Ind. Eng. Chem. Res. 51, p. 1438; and Choi et al., 2009, ChemSusChem, 2, p. 796. Unfortunately, $CO_2$ adsorption in most of these materials is impaired by the water present in flue gas, which passivates the $CO_2$ binding sites and/or degrades the material. See, Woerner, et al., 2016, J. Phys. Chem. C 120, p. 360; Kim et al., 2016, Energy Environ. Sci. 9, p. 1803; Mason et al., 2015, J. Am. Chem. Soc. 137, p. 4787; and Wang and LeVan, 2010, J. Chem. Eng. Data 55, p. 3189. Amine-functionalized porous solids, such as amine-appended silicas, combine the best of both classes of materials while maintaining high $CO_2/N_2$ selectivities under humid conditions. See, Lee and Park., 2015, Ind. Eng. Chem. 23, p. 1; Samanta et al., 2012, Ind. Eng. Chem. Res. 51, p. 1438; Choi et al., 2009, ChemSusChem 2, p. 796; Kim et al., 2016, Energy Environ. Sci. 9, p. 1803; Mason et al., 2015, J. Am. Chem. Soc. 137, p. 4787; Ünveren et al., 2017, Petroleum 3, p. 37; Didas et al., 2014, J. Phys. Chem. Lett. 5, p. 4194; Bacsik et al., 2011, Langmuir 27, p. 11118; Sayari and Belmabkhout, 2010 J. Am. Chem. Soc. 132, p. 6312; Serna-Guerrero et al., 2008, Ind. Eng. Chem. Res. 47, 9406. However, one often overlooked drawback of many of these adsorbents is the significant co-adsorption of $H_2O$ upon $CO_2$ adsorption, contributing to parasitic energy costs upon regeneration as water is desorbed from the bed with $CO_2$. See, Mason et al., 2015, J. Am. Chem. Soc. 137, p. 4787; Veneman et al., 2014, Energy Procedia 63, p. 2336; Xu et al., 2005, Ind. Eng. Chem. Res. 44, p. 8113; and Franchi et al., 2005, Ind. Eng. Chem. Res. 44, p. 8007.

Metal-organic frameworks are a class of porous solids consisting of metal nodes connected by polytopic organic linkers that allow for precise control over pore architecture and thus fine-tuning of an adsorbent's properties. See, Zhou et al., 2012, Chem. Rev. 112, p. 673; Furukawa et al., 2013, Science 341, p. 123044; Eddaoudi et al., 2002, Science 295, p. 469. Many metal-organic frameworks have been evaluated for CCS. For selected reviews, see: Yu et al., 2017, Chem. Rev., (DOI: 10.1021/acs.chemrev.6b0062); Sabouni et al., 2014, Environ. Sci. Pollut. Res. 21, p. 5427; Sumida et al., 2012, Chem. Rev. 112, p. 724; Liu et al., 2012, Greenhouse Gasses Sci. Technol. 2, p. 239; Li et al., 2011, Coord. Chem. Rev. 255, p. 1791; and D'Alessandro et al., 2010, Angew. Chem. Int. Ed., 49, p. 6058. In particular, amine-functionalized (Sumida et al., 2012, Chem. Rev. 112, p. 724; Lin et al., 2016, RSC Adv. 6, p. 32598; Qiao et al., 2016, Chem. Commun. 52, p. 974; Liao et al., 2016, Chem. Sci. 7, p. 6528; Fracaroli et al., 2014, J. Am. Chem. Soc. 136, p. 8863; Cao et al., 2013, J. Environ. Sci. 25, p. 2081; Montoro et al., 2012, J. Mater. Chem. 22, p. 10155; Liu et al., 2012, Chem. Soc. Rev. 41, p. 2308) and hydrophobic (See, Bhatt et al., 2016, J. Am. Chem. Soc. 138, p. 9301; Fernandez et al., 2015, Dalton Trans. 44, p. 13490; Elsaidi et al., 2015, Chem. Commun. 51, p. 15530; Canivet et al., 2014, Chem. Soc. Rev. 43, p. 5594; Nugent et al., 2013, Nature 495, p. 80; Chen et al., 2013, Chem. Commun. 49, p. 6846; Yang et al., 2011, J. Am. Chem. Soc. 133, p. 18094; h) Nguyen and Cohen, 2010, J. Am. Chem. Soc. 132, p. 4560; and Tanabe and Cohen, 2010, Chem. Soc. Rev. 40, p. 498) metal-organic frameworks are promising for these applications due to their ability to capture $CO_2$ in the presence of water while potentially minimizing water co-adsorption. However, the long-term performance and stability of many of these materials under humid conditions has not been reliably established. Therefore, despite extensive efforts there remains a continuing need for new stable adsorbents for carbon capture applications.

Accordingly, what is needed in the art are adsorbents that enable effective capture of $CO_2$ at low partial pressures (e.g., a 40° C. step occurring at or below 15 mbar for flue gas capture, or at or below 400 ppm at 25° C. for carbon capture from air) while being regenerable at moderate temperatures (e.g., <150° C.) with a low regeneration energy.

SUMMARY

The applicability of 1°,2°-alkylethylenediamine- and 1°,2°-alkylpropylenediamine-appended metal-organic frameworks (where 1°,2°-diamines are defined as those bearing one primary amine and one secondary amine) for CCS has been assessed by evaluating their $CO_2$ capture performance under humid conditions as well as their stability to adsorption/desorption cycling in a simulated temperature swing adsorption process. During the course of this work, several important trends were identified that will prove useful for employing this class of materials for carbon capture.

First, we have found that diamines bearing large alkyl groups interfere with ammonium carbamate chain formation at adjacent sites in $Mg_2$(dobpdc) (dobpdc$^{4-}$=4,4'-dioxidobiphenyl-3,3'-dicarboxylate), a metal-organic framework with one-dimensional hexagonal channels approximately 18 Å in diameter and lined with $Mg^{2+}$ sites. This is likely due to unfavorable interactions in the a-b plane of the framework. This destabilization of adjacent ammonium carbamate chains leads to undesirable two-step $CO_2$ adsorption/desorption profiles, as well as increased water-co-adsorption under humid conditions. However, the steric interactions between adjacent diamines could be minimized by judiciously positioning the metal sites farther apart from one another using frameworks with either a longer organic linker ($Mg_2$(dotpdc)) or a more uniformly hexagonal pore structure ($Mg_2$(pc-dobpdc)). Notably, these findings represent the first examples of cooperative $CO_2$ chemisorption in metal-organic frameworks other than the $M_2$(dobpdc) (M=Mg, Mn, Fe, Co, Zn) series. See, McDonald et al., 2015, Nature 519, p. 303; Drisdell et al., 2015 Phys Chem Chem Phys 17, p. 2144; McDonald et al., 2015, J. Am. Chem. Soc. 134, p. 7056; Jo et al., 2017, ChemSusChem 10, p. 541; Lee et al., 2015, Chem. Sci. 6, p. 3697; Lee et al., 2014, Energy Environ. Sci. 7, p. 744.

Second, we have found that increasing the molecular weight of the diamine is a general strategy for improving the thermal stability of the resulting diamine-appended metal-organic framework towards diamine loss under humid conditions. However, increasing the size of the diamine does lead to decreased gravimetric capacities and potentially slower $CO_2$ diffusion through the pores due to the decreased pore diameter. Therefore, only the largest diamine necessary to achieve stable adsorption/desorption cycling should be employed for a CCS process.

Third, when developing new adsorbents for humid CCS applications, it is important to focus not only on the ability of the adsorbent to competitively capture $CO_2$ under humid conditions, but also on the amount of water co-adsorbed with $CO_2$ in order to minimize parasitic energy costs upon regeneration. Notably, the majority of these adsorbents display minimal water co-adsorption at temperatures above 60° C., indicating that these parasitic costs can be reduced by carrying out carbon capture at elevated temperatures. In addition, increasing the size of the 2° alkyl group in 1°,2°-alkylethylenediamine-appended variants of $Mg_2$(pc-dobpdc) leads to steadily decreasing molar amounts of water co-adsorption, indicating that the addition of hydrophobic alkyl groups to the pore environment is a potential strategy for minimizing water co-adsorption. In contrast, the same low amount of water co-adsorption on a molar basis was found for diamine-appended variants of $Mg_2$(dotpdc), confirming that the framework architecture also has an effect on the overall hydrophobicity of the pores.

These extensive studies disclosed herein led to the identification of EMM-50 (nHex-2-$Mg_2$(dobpdc)), EMM-51 (nHept-2-$Mg_2$(dotpdc)) and EMM-52 (nHept-2-$Mg_2$(pc-dobpdc)) as adsorbents for CCS that show $CO_2$ adsorption/desorption cycle stability. In particular, EMM-51 and EMM-52 display sharp $CO_2$ adsorption steps at low pressures (<0.7 mbar, 40° C.), minimal water co-adsorption under humid conditions, and high thermal stability to diamine loss upon adsorption/desorption cycling in a simulated temperature swing adsorption process. Owing to its higher gravimetric and volumetric $CO_2$ adsorption capacities, EMM-52 is the more promising of the two adsorbents. As such EMM-52 is suitable for carbon capture from humid gas streams.

BRIEF DESCRIPTION OF THE DRAWINGS

FIG. 1A illustrates a structure of the metal-organic framework $Mg_2$(dobpdc) (dobpdc$^{4-}$=4,4'-dioxidobiphenyl-3,3'-dicarboxylate); FIG. 1B illustrates appending alkylethylenediamines to the open $Mg^{2+}$ sites of the framework yields adsorbents displaying step-shaped adsorption of $CO_2$; FIG. 1C illustrates a portion of the structure of the ammonium carbamate chains formed upon $CO_2$ adsorption in i-2-$Zn_2$(dobpdc), which is isostructural to the Mg framework;[14b] and FIG. 1D illustrates the bulky linear and branched primary, secondary (1°,2°) alkylethylenediamines provided in the present disclosure.

DETAILED DESCRIPTION OF THE INVENTION

I. Introduction

Figure 1A:
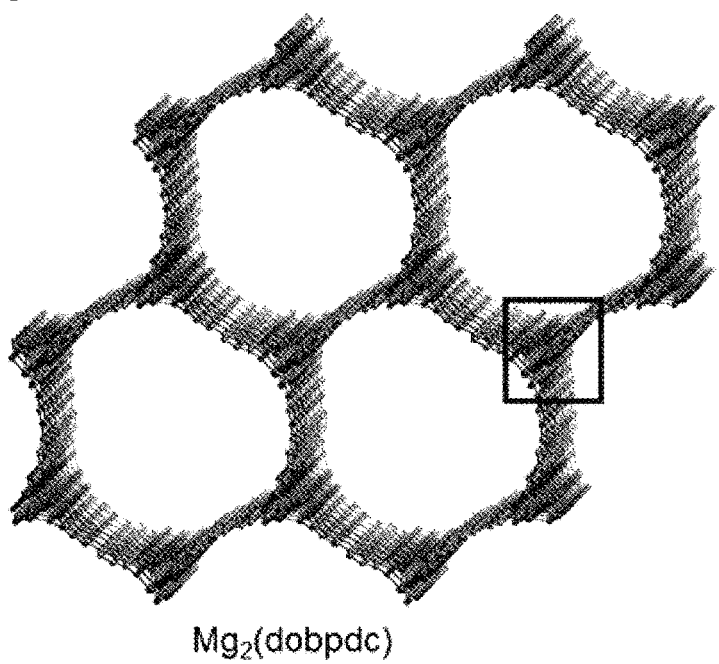
FIGS. 1A, 1B, 1C, and 1D.
Figure 1A:
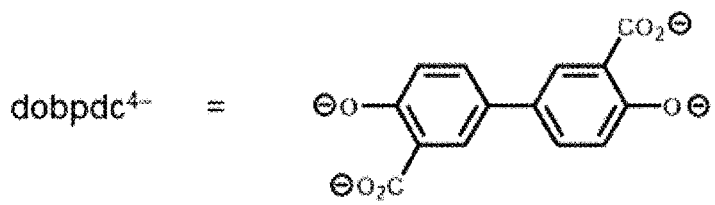
Figure 1B:
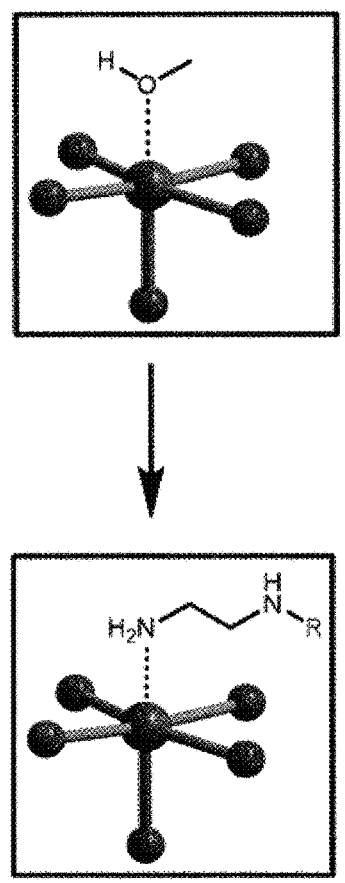

Recently, a new class of diamine-appended metal-organic frameworks has been evaluated that is prepared by post-synthetically appending alkylethylenediamines and alkylpropylenediamines to the open $Mg^{2+}$ sites of $Mg_2$(dobpdc) (dobpdc$^{4-}$=4,4'-dioxidobiphenyl-3,3'-dicarboxylate), a metal-organic framework possessing 1-dimensional hexagonal channels lined with $Mg^{2+}$ sites as illustrated in FIG. 1a. See, McDonald et al., 2015, Nature 519, p. 303; Drisdell et al., 2015, Phys Chem Chem Phys 17, p. 2144; McDonald, 2012, J. Am. Chem. Soc. 134, p. 7056; Jo et al., 2017, ChemSusChem 10, p. 541; Lee et al., 2015, Chem. Sci. 6, p. 3697; and Lee et al. 2014, Energy Environ. Sci. 7, p. 744. Upon diamine functionalization (FIG. 1b), these materials display step-shaped adsorption of $CO_2$ with a step pressure that can be tuned by controlling the structure of the appended diamine. These sigmoidal adsorption profiles result from the cooperative formation of highly stabilized ammonium carbamate chains down the c-axis (FIG. 1c) and enable high working capacities (>2.5 mmol/g) to be achieved with minimal temperature swings (e.g., $\Delta T=60°$ C.). See, McDonald et al., 2015, Nature 519, p. 303. In addition, these materials generally possess modest regeneration energies and high $CO_2/N_2$ selectivities, even under humid conditions. Analysis of diamine-appended variants of $Mg_2$(dobpdc) suggests that 1°,2°-alkylethylenediamines, such as e-2 and i-2 (FIG. 1d), are among the most promising for CCS from dilute gas streams due to their low $CO_2$ adsorption step pressures (<1 mbar, 40° C.) and stability towards diamine loss compared to secondary, secondary (2°,2°) diamines. However, prior to the present disclosure, it remained unclear if these diamine-appended metal-organic frameworks possess the requisite stability required for long term application in a CCS process.

Figure 1C:
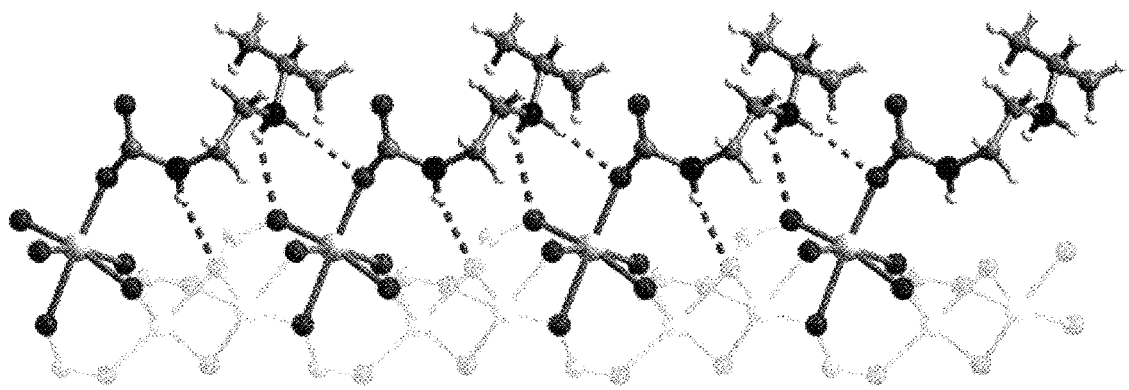
Figure 1D:
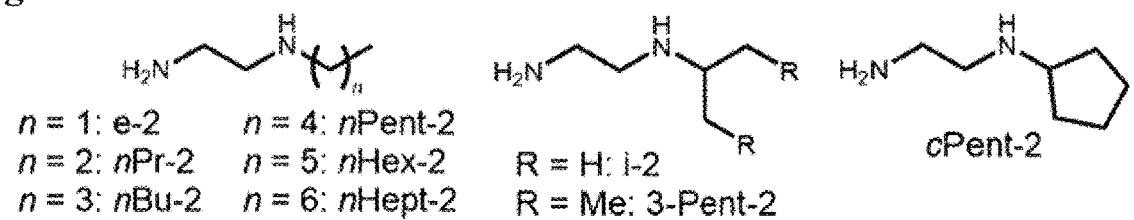

Herein, 1°,2° alkylethylenediamines and 1°,2° alkylpropylenediamine bearing large hydrophobic alkyl groups are appended to $Mg_2$(dobpdc) to potentially minimize diamine volatilization and water co-adsorption (FIG. 1d). Unexpectedly, the use of these bulky diamines led to two distinct $CO_2$ adsorption steps, each corresponding to half of the expected capacity of 1 $CO_2$ per diamine. The two adsorption steps likely result from disruptive interactions in the a-b plane between adjacent sets of ammonium carbamate chains. In addition to potentially reducing the $CO_2$ adsorption capacity of these materials from a flue gas stream, the two-step adsorption behavior was found to contribute to increased co-adsorption of water under humid conditions. To alleviate these unfavorable steric interactions, the base framework was changed from $Mg_2$(dobpdc) to either the isoreticularly expanded framework $Mg_2$(dotpdc) (dotpdc$^{4-}$=4,4''-dioxido-[1,1':4',1''-terphenyl]-3,3''-dicarboxylate) or the isomeric framework Mg-IRMOF-74-II (See, Deng et al., 2012, Science 336, p. 1018) referred to herein as $Mg_2$(pc-dobpdc) (pc-dobpdc$^{4-}$=3,3'-dioxidobiphenyl-4,4'-dicarboxylate, pc=para-carboxylate). Variants of these two frameworks appended with bulky 1°,2°-diamines, such as N-(n-heptyl) ethylenediamine (nHept-2), display a single $CO_2$ adsorption step at low pressures (<1 mbar at 40° C.) along with minimal co-adsorption of water in thermogravimetric analysis (TGA) experiments, owing to the formation of tightly bound ammonium carbamate chains lined with hydrophobic alkyl groups. These properties render bulky 1°,2°-alkylethylenediamine-appended variants of $Mg_2$(pc-dobpdc) and $Mg_2$(dotpdc) promising adsorbents for CCS applications from dilute gas streams.

Before the invention is described in greater detail, it is to be understood that the invention is not limited to particular embodiments described herein as such embodiments may vary. It is also to be understood that the terminology used herein is for the purpose of describing particular embodiments only, and the terminology is not intended to be limiting. The scope of the invention will be limited only by the appended claims. Unless defined otherwise, all technical and scientific terms used herein have the same meaning as commonly understood by one of ordinary skill in the art to which this invention belongs. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention. Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number. All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided might be different from the actual publication dates, which may need to be independently confirmed.

It is noted that the claims may be drafted to exclude any optional element. As such, this statement is intended to serve as antecedent basis for use of such exclusive terminology as "solely," "only," and the like in connection with the recitation of claim elements, or use of a "negative" limitation. As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method may be carried out in the order of events recited or in any other order that is logically possible. Although any methods and materials similar or equivalent to those described herein may also be used in the practice or testing of the invention, representative illustrative methods and materials are now described.

In describing the present invention, the following terms will be employed, and are defined as indicated below.

II. Definitions

Where substituent groups are specified by their conventional chemical formulae, written from left to right, the structures optionally also encompass the chemically identical substituents, which would result from writing the structure from right to left, e.g., —$CH_2O$— is intended to also optionally recite —$OCH_2$—.

The term "alkyl," by itself or as part of another substituent, means, unless otherwise stated, a straight or branched chain, or cyclic hydrocarbon radical, or combination thereof, which may be fully saturated, mono- or polyunsaturated and can include di-, tri- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to optionally include those derivatives of alkyl defined in more detail below, such as "heteroalkyl." Alkyl groups that are limited to hydrocarbon groups are termed "homoalkyl". Exemplary alkyl groups include the monounsaturated $C_{9-10}$, oleoyl chain or the diunsaturated $C_{9-10,\ 12-13}$ linoeyl chain.

The term "alkylene" by itself or as part of another substituent means a divalent radical derived from an alkane, as exemplified, but not limited, by —$CH_2CH_2CH_2CH_2$—, and further includes those groups described below as "heteroalkylene." Typically, an alkyl (or alkylene) group will have from 1 to 24 carbon atoms, with those groups having 10 or fewer carbon atoms being preferred in the present invention. A "lower alkyl" or "lower alkylene" is a shorter chain alkyl or alkylene group, generally having eight or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The terms "aryloxy" and "heteroaryloxy" are used in their conventional sense, and refer to those aryl or heteroaryl groups attached to the remainder of the molecule via an oxygen atom.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si and S, and wherein the nitrogen and sulfur atoms may optionally be oxidized and the nitrogen heteroatom may optionally be quaternized. The heteroatom(s) O, N and S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$,—S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

The terms "cycloalkyl" and "heterocycloalkyl," by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Further exemplary cycloalkyl groups include steroids, e.g., cholesterol and its derivatives. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl substituent groups (or rings) that contain from one to four heteroatoms selected from N, O, S, Si and B, wherein the nitrogen and sulfur atoms are optionally oxidized, and the nitrogen atom(s) are optionally quaternized. An exemplary heteroaryl group is a six-membered azine, e.g., pyridinyl, diazinyl and triazinyl. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes aryl, heteroaryl and heteroarene rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl, and "heteroaryl") are meant to optionally include both substituted and unsubstituted forms of the indicated species. Exemplary substituents for these species are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: H, substituted or unsubstituted aryl, substituted or unsubstituted heteroaryl, substituted or unsubstituted heterocycloalkyl, —OR', =O, =NR', =N—OR', —NR'R", —SR', halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$ in a number ranging from zero to (2m'+1), where m' is the total number of carbon atoms in such radical. R', R", R"' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R"' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like). These terms encompass groups considered exemplary "alkyl group substituents", which are components of exemplary "substituted alkyl" and "substituted heteroalkyl" moieties.

Similar to the substituents described for the alkyl radical, substituents for the aryl heteroaryl and heteroarene groups are generically referred to as "aryl group substituents." The substituents are selected from, for example: groups attached to the heteroaryl or heteroarene nucleus through carbon or a heteroatom (e.g., P, N, O, S, Si, or B) including, without limitation, substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R"', —OC(O)R', —C(O)R', —CO$_2$R', —CONR'R", —OC(O)NR'R", —NR"C(O)R', —NR'—C(O)NR"R"', —NR"C(O)$_2$R', —NR—C(NR'R"R"')=NR"", —NR—C(NR'R")=NR"', —S(O)R', —S(O)$_2$R', —S(O)$_2$NR'R", —NRSO$_2$R', —CN and —NO$_2$, —R', —N$_3$, —CH(Ph)$_2$, fluoro($C_1$-$C_4$)alkoxy, and fluoro($C_1$-$C_4$)alkyl, in a number ranging from zero to the total number of open valences on the aromatic ring system. Each of the above-named groups is attached to the heteroarene or heteroaryl nucleus directly or through a heteroatom (e.g., P, N, O, S, Si, or B); and where R', R", R"' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R"' and R"" groups when more than one of these groups is present.

Two of the substituents on adjacent atoms of the aryl, heteroarene or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl, heteroarene or heteroaryl ring may optionally be replaced with a substituent of the formula —(CRR')$_s$—X—(CR"R"')$_d$—, where s and d are independently integers of from 0 to 3, and X is —O—, —NR'—, —S—, —S(O)—, —S(O)$_2$—, or —S(O)$_2$NR'—. The substituents R, R', R" and R"' are preferably independently selected from hydrogen or substituted or unsubstituted ($C_1$-$C_6$)alkyl. These terms encompass groups considered exemplary "aryl group substituents", which are components of exemplary "substituted aryl" "substituted heteroarene" and "substituted heteroaryl" moieties.

As used herein, the term "acyl" describes a substituent containing a carbonyl residue, C(O)R. Exemplary species for R include H, halogen, substituted or unsubstituted alkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non-aromatic rings. Examples of "fused ring systems" are naphthalenes, indoles, quinolines, chromenes and the like.

As used herein, the term "heteroatom" includes oxygen (O), nitrogen (N), sulfur (S) and silicon (Si), boron (B) and phosphorous (P).

The symbol "R" is a general abbreviation that represents a substituent group that is selected from H, substituted or unsubstituted alkyl, substituted or unsubstituted heteroalkyl, substituted or unsubstituted aryl, substituted or unsubstituted heteroaryl, and substituted or unsubstituted heterocycloalkyl groups.

The compounds disclosed herein may also contain unnatural proportions of atomic isotopes at one or more of the atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present invention, whether radioactive or not, are intended to be encompassed within the scope of the present invention.

The term "salt(s)" includes salts of the compounds prepared by the neutralization of acids or bases, depending on the particular ligands or substituents found on the compounds described herein. When compounds of the present invention contain relatively acidic functionalities, base addition salts can be obtained by contacting the neutral form of such compounds with a sufficient amount of the desired base, either neat or in a suitable inert solvent. Examples of base addition salts include sodium, potassium calcium, ammonium, organic amino, or magnesium salt, or a similar salt. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids, and the like, as well as the salts derived from relatively nontoxic organic acids like acetic, propionic, isobutyric, butyric, maleic, malic, malonic, benzoic, succinic, suberic, fumaric, lactic, mandelic, phthalic, benzenesulfonic, p-tolylsulfonic, citric, tartaric, methanesulfonic, and the like. Certain specific compounds of the present invention contain both basic and acidic functionalities that allow the compounds to be converted into either base or acid addition salts. Hydrates of the salts are also included.

"—COOH" as this term is used refers to is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion. Exemplary polymers of the invention include a protonated carboxylic moiety (COOH). Exemplary polymers of the invention include a deprotonated carboxylic moiety (COO$^-$). Various polymers of the invention include both a protonated carboxylic moiety and a deprotonated carboxylic moiety.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure or be stereoisomeric mixtures. In addition it is understood that, in any compound described herein having one or more double bond(s) generating geometrical isomers that can be defined as E or Z, each double bond may independently be E or Z a mixture thereof. Likewise, it is understood that, in any compound described, all tautomeric forms are also intended to be included.

Below are examples of specific embodiments of the present disclosure. The examples are offered for illustrative purposes only, and are not intended to limit the scope of the present invention in any way.

III. Compositions

One aspect of the present disclosure provides an adsorption material. The adsorption material comprises an adsorption material, comprising a metal-organic framework comprising a plurality of metal ions and a plurality of polytopic organic linkers, where each polytopic organic linker in the plurality of polytopic organic linker is connected to at least two metal ions in the plurality of metal ions. The adsorption material further comprises a plurality of ligands, where each respective ligand in the plurality of ligands is amine appended to a metal ion in the plurality of metal ions of the metal-organic framework. Each respective ligand in the plurality of ligands comprises:

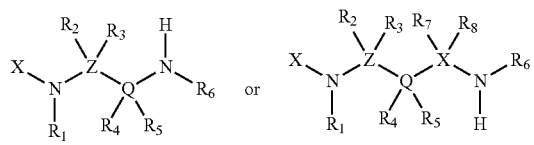

where, X is a metal ion of the metal-organic framework, Z is carbon, silicon, germanium, sulfur, or selenium, Q is carbon, silicon, germanium, sulfur, or selenium, $R_1$, $R_2$, $R_3$, $R_4$, $R_5$, $R_7$, and $R_8$ are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, and $R_6$ is substituted or unsubstituted alkyl, substituted or unsubstituted heteroalkyl, substituted or unsubstituted aryl, substituted or unsubstituted heteroaryl, or substituted or unsubstituted heterocycloalkyl comprising at least three non-hydrogen atoms.

In some embodiments, each metal ion (X) in the plurality of metal ions is Mg, Ca, Mn, Cr, Fe, Co, Ni, Cu, or Zn.

In some embodiments, $R_6$ is substituted or unsubstituted alkyl having between three and ten carbon atoms (e.g., an n-alkane with between three and ten carbon atoms). In some embodiments, $R_6$ is propyl, butyl, pentyl, hexyl, or heptyl. In some embodiments, $R_6$ is a branched-chain alkane. In some embodiments, $R_6$ is a substituted or unsubstituted heterocycloalkyl. In some embodiments, $R_6$ is a cycloalkane. In still other embodiments, $R_6$ is substituted or unsubstituted cyclopropane, cyclobutane, cylopentane, or cyclohexane.

In some embodiments, $R_1$ is hydrogen.

In some embodiments, $R_2$, $R_3$, $R_4$, and $R_5$ are each hydrogen, and Z and Q are each carbon.

In some embodiments, each metal ion (X) in the plurality of metal ions is Mg.

In a particular embodiment, each ligand in the plurality of ligands is N-(n-heptyl)ethylenediamine.

In a particular embodiments, the polytopic organic linker is 4,4'-dioxidobiphenyl-3,3'-dicarboxylate (dobpdc$^{4-}$), 4,4''-dioxido-[1,1':4',1''-terphenyl]-3,3''-dicarboxylate (dotpdc$^{4-}$), or dioxidobiphenyl-4,4'-dicarboxylate (para-carboxylate-dobpdc$^{4-}$).

In some embodiments, the adsorption material exhibits a single $CO_2$ adsorption step upon $CO_2$ adsorption. In some embodiments, the adsorption material exhibits a single $CO_2$ desorption step upon $CO_2$ desorption.

In some embodiments, adsorption material has a 77 K $N_2$ Brunauer-Emmett-Teller (BET) surface area of at least 3050 m$^2$/g. In some embodiments, the adsorption material has a Langmuir surface area of at least 5800 m$^2$/g. In some embodiments, the crystallographic density of the adsorption material is between 0.4 g/cm$^3$ and 1.2 g/cm$^3$.

In some embodiments, $R_6$ has a molecular weight of 44 g/mol or greater, 58 g/mol or greater, 72 g/mol or greater, or 86 g/mol or greater. In some embodiments, $R_6$ has a molecular weight of between 72 g/mol and 500 g/mol. In some embodiments, $R_6$ has a molecular weight of between 58 g/mol and 400 g/mol. In some embodiments, $R_6$ has a molecular weight of between 44 g/mol and 300 g/mol.

In some embodiments, the polytopic organic linker has the formula:

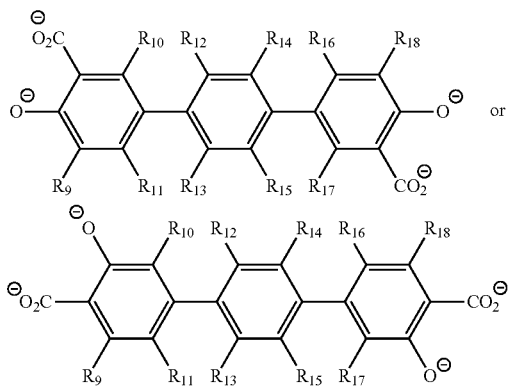

where $R_9$, $R_{10}$, $R_{11}$, $R_{12}$, $R_{13}$, $R_{14}$, $R_{15}$, $R_{16}$, $R_{17}$, and $R_{18}$ are each independently selected from H, halogen, hydroxyl, methyl, and halogen substituted methyl.

In some embodiments, the polytopic organic linker has the formula:

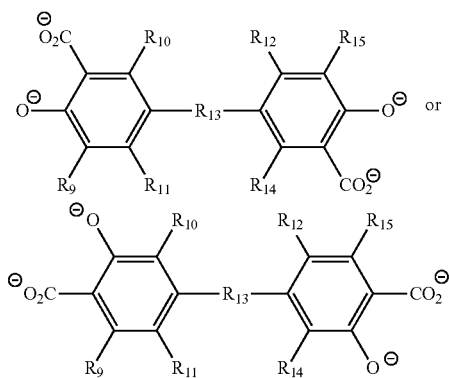

where $R_9$, $R_{10}$, $R_{11}$, $R_{12}$, $R_{10}$ and $R_{15}$ are each independently selected from H, halogen, hydroxyl, methyl, and halogen substituted methyl, and $R_{13}$ is selected from substituted or unsubstituted aryl, vinyl, alkynyl, and substituted or unsubstituted heteroaryl.

In some embodiments, the polytopic organic linker has the formula:

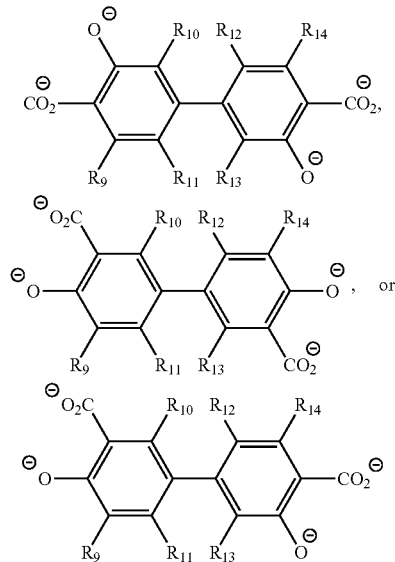

where $R_9$, $R_{10}$, $R_{11}$, $R_{12}$, $R_{13}$ and $R_{14}$ are each independently selected from H, halogen, hydroxyl, methyl, and halogen substituted methyl.

IV. Technical Applications

In one aspect of the present disclosure, there is provided a number of technical applications for the disclosed adsorption materials.

One such application is carbon capture from coal flue gas. The increasing atmospheric levels of carbon dioxide ($CO_2$), which are contributing to global climate change, warrant new strategies for reducing $CO_2$ emissions from point sources such as power plants. In particular, coal-fueled power plants are responsible for 30-40% of global $CO_2$ emissions. See, Quadrelli et al., 2007, "The energy-climate challenge: Recent trends in $CO_2$ emissions from fuel combustion," Energy Policy 35, pp. 5938-5952, which is hereby incorporated by reference. Thus, there remains a continuing need for the development of new adsorbents for carbon capture from coal flue gas, a gas stream consisting of $CO_2$ (15-16%), $O_2$ (3-4%), $H_2O$ (5-7%), $N_2$ (70-75%), and trace impurities (e.g. $SO_2$, NOR) at ambient pressure and 40° C. See, Planas et al., 2013, "The Mechanism of Carbon Dioxide Adsorption in an Alkylamine-Functionalized Metal-Organic Framework," J. Am. Chem. Soc. 135, pp. 7402-7405, which is hereby incorporated by reference. In particular, for a temperature swing adsorption process an adsorbent should possess the following properties: (a) a high working capacity with a minimal temperature swing, in order to minimize regeneration energy costs; (b) high selectivity for $CO_2$ over the other constituents of coal flue gas; (c) 90% capture of $CO_2$ under flue gas conditions; (d) effective performance under humid conditions; and (d) long-term stability to adsorption/desorption cycling under humid conditions.

Another such application is carbon capture from crude biogas. Biogas, the $CO_2/CH_4$ mixtures produced by the breakdown of organic matter, is a renewable fuel source with the potential to replace traditional fossil fuel sources. Removal of $CO_2$ from the crude biogas mixtures is one of the most challenging aspects of upgrading this promising fuel source to pipeline quality methane. Therefore, the use of adsorbents to selectively remove $CO_2$ from high pressure $CO_2/CH_4$ mixtures with a high working capacity and minimal regeneration energy has the potential to greatly reduce the cost of using biogas in place of natural gas for applications in the energy sector.

The disclosed compositions (adsorption materials) can be used to thermally strip a major portion of the $CO_2$ from the adsorption material enriched for $CO_2$ using a temperature swing adsorption method or a vacuum swing adsorption method. Example temperature swing adsorption methods and vacuum swing adsorption methods are disclosed in International Publication Number WO2013/059527 A1, which is hereby incorporated by reference.

V. Examples

Synthesis of 1°,2°-alkylethylenediamines and Grafting to $Mg_2$(Dobpdc).

Our initial studies of diamine-appended variants of $Mg_2$(dobpdc) suggested that 1°,2°-alkylethylenediamines (FIG. 1d) warranted further study for CCS applications due to their improved thermal stabilities compared to 2°,2°-alkylethylenediamines, lower step pressures compared to 1°,3°-alkylethylenediamines, and minimal hysteresis upon $CO_2$ desorption. These favorable properties result from both the strong 1° amine-metal bond in the amine phase as well as the formation of tightly bound ammonium carbamate chains with extensive hydrogen-bonding to the framework (FIG. 1c). Based on these results, we reasoned that increasing the size of the alkyl group on the 2° amine might further reduce diamine loss upon long-term adsorption/desorption cycling without interfering in the cooperative $CO_2$ adsorption mechanism.

To the probe the effect of increasing the size of the alkyl group on the 2° amine, $Mg_2$(dobpdc) was functionalized with a series of 1°,2°-alkylethylenediamines substituted with linear alkyl groups, including ethyl (e-2), n-propyl (nPr-2), n-butyl (nBu-2), n-pentyl (nPent-2), n-hexyl (nHex-2), and n-heptyl (nHept-2) groups, as well as branched alkyl groups, including iso-propyl (i-2), cyclopentyl (cPent-2), and 3-pentyl groups (3-Pent-2) (FIG. 1d). We previously appended e-2 and i-2 to this framework, producing adsorbents demonstrating step-shaped adsorption of $CO_2$ at low partial pressures (<1 mbar) at 40° C. Although nPr-2 and nBu-2 are commercially available, the other 1°,2°-alkylethylenediamines shown in FIG. 1d are not. A simple synthetic protocol was developed for the preparation of diamines substituted with nPent, nHex, nHept, cPent, and 3-Pent groups. See, Lee and Klajn, 2015, Chem. Commun. 51, p. 2036, which is hereby incorporated by reference.

Following our protocol for grafting diamines by addition of a freshly prepared 20 v/v % solution of the target diamine in toluene to methanol-solvated $Mg_2$(dobpdc), nearly all of the bulky 1°,2°-alkylethylenediamines in FIG. 2 were grafted to $Mg_2$(dobpdc) with high diamine loadings (>90% occupancy of the $Mg^{2+}$ sites), as determined by $^1H$ NMR after digestion with DCl in DMSO-$d_6$. Unfortunately, all attempts to graft the largest diamine in this series, nHept-2, led to low diamine loadings (~69%) and a lack of a $CO_2$ adsorption step, likely due to the inability of the pore to readily accommodate the large n-Heptyl groups. As expected, the grafting of increasingly large diamines to $Mg_2$(dobpdc) led to a gradual decrease in the Langmuir surface areas determined from 77 K $N_2$ adsorption isotherms, from 3934 $m^2/g$ for activated $Mg_2$(dobpdc) to 1374 $m^2/g$ (e-2), 1091 $m^2/g$ (nPr-2), 892 $m_2/g$ (nBu-2), 698 $m^2/g$ (nPent-2), and 503 $m_2/g$ (nHex-2). Increasing the molecular weight of the diamine concurrently increased the temperature at which the maximum rate of diamine loss occurred upon decomposition under dry $N_2$, from 280° C. for N-methylethylenediamine (m-2) to 344° C. for nHex-2. Therefore, the adsorbents functionalized with the largest diamines in this series should possess the greatest stability to diamine volatilization during adsorption/desorption cycling.

Observation of Two-Step $CO_2$ Adsorption for $Mg_2$ (Dobpdc) Variants.

With a series of 1°,2°-alkylethylenediamine-appended $Mg_2$(dobpdc) variants in hand, we next examined their $CO_2$ adsorption/desorption profiles. Thermogravimetric analysis (TGA) measurements conducted under flowing $CO_2$ enabled high-throughput analysis of a large series of adsorbents. In these measurements, high $CO_2$ adsorption step temperatures correspond to low $CO_2$ step pressures in isothermal measurements. The results of these measurements are summarized in FIG. 2.

The compound EMM-50(e-2) (e-2-$Mg_2$(dobpdc)) displayed a single $CO_2$ adsorption step at a relatively high temperature (125° C.), corresponding to an adsorption step at 0.5 mbar in the 40° C. isotherm. However, further increasing the size of the alkyl group on the 2° amine led to two sharp steps upon both $CO_2$ adsorption and desorption, each corresponding to approximately 50% of the expected $CO_2$ capacity assuming the chemisorption of one $CO_2$ per diamine (FIG. 2). Careful analysis of the pure $CO_2$ desorption isobar of EMM-50(e-2) revealed the possible presence of two subtle $CO_2$ desorption steps. Consistently, we have observed that the single-crystal X-ray diffraction structure of $CO_2$-inserted e-2-$Zn_2$(dobpdc) possesses two distinct ammonium carbamate chain conformations. Increasing the molecular weight of the diamine also led to a gradual decrease in gravimetric capacity due to the higher molecular weight of the diamine. We have observed a two-step $CO_2$ adsorption profile for EMM-50(i-2) (i-2-$Mg_2$(dobpdc)), but this behavior appears to occur generally for 1°,2°-alkylethylenediamines bearing large alkyl substituents. With the exception of e-2, two adsorption steps were also observed in the 40° C. $CO_2$ isotherms of the adsorbents shown in FIG. 2, confirming that this behavior is not a kinetic effect. In addition, two-step $CO_2$ adsorption/desorption profiles were observed with $Mg_2$(dobpdc) functionalized with 1°,3°-alkylethylenediamines 2°,2°-alkylethylenediamines bearing N-substituents larger than methyl groups, suggesting that this behavior is common to variants of $Mg_2$(dobpdc) appended with sterically encumbered alkylethylenediamines. We have also observed that 1°,2°-alkylpropylenediamines exhibit the same behavior, likely by the same mechanism.

The occurrence of two distinct adsorption/desorption steps in these materials suggests that they undergo two phase transitions upon $CO_2$ adsorption and desorption, as has been previously reported for certain flexible metal-organic frameworks. For examples with $CO_2$, see: Ichikawa et al., 2016, Langmuir 32, p. 9722; Wu et al., 2015, Dalton Trans. 44, p. 10141; Sanda et al., 2013, Inorg. Chem. 52, p. 12866; Park and Suh, 2010, Chem. Commun. 46, 610; and Bourrelly et al., 2005, J. Am. Chem. Soc. 127, p. 13519. For examples with $N_2$, see, Taylor et al., 2016, J. Am. Chem. Soc. 138, p.

15019; Salles et al., 2010, J. Am. Chem. Soc. 132, p. 13782; and Kondo et al., 2007, J. Am. Chem. Soc. 129, p. 12362. This behavior is undesirable for CCS applications because it could lead to diminished working capacities if the second step occurs at too high of a pressure for the target flue gas stream. For example, cooling EMM-50(3-Pent-2) (3-Pent-2-Mg$_2$(dobpdc)) under a stream of dry simulated coal flue gas (15% $CO_2$ in $N_2$) revealed that the second adsorption step was inoperative at temperatures above 30° C., leading to half the expected $CO_2$ capacity at 40° C.

Figure 2A:
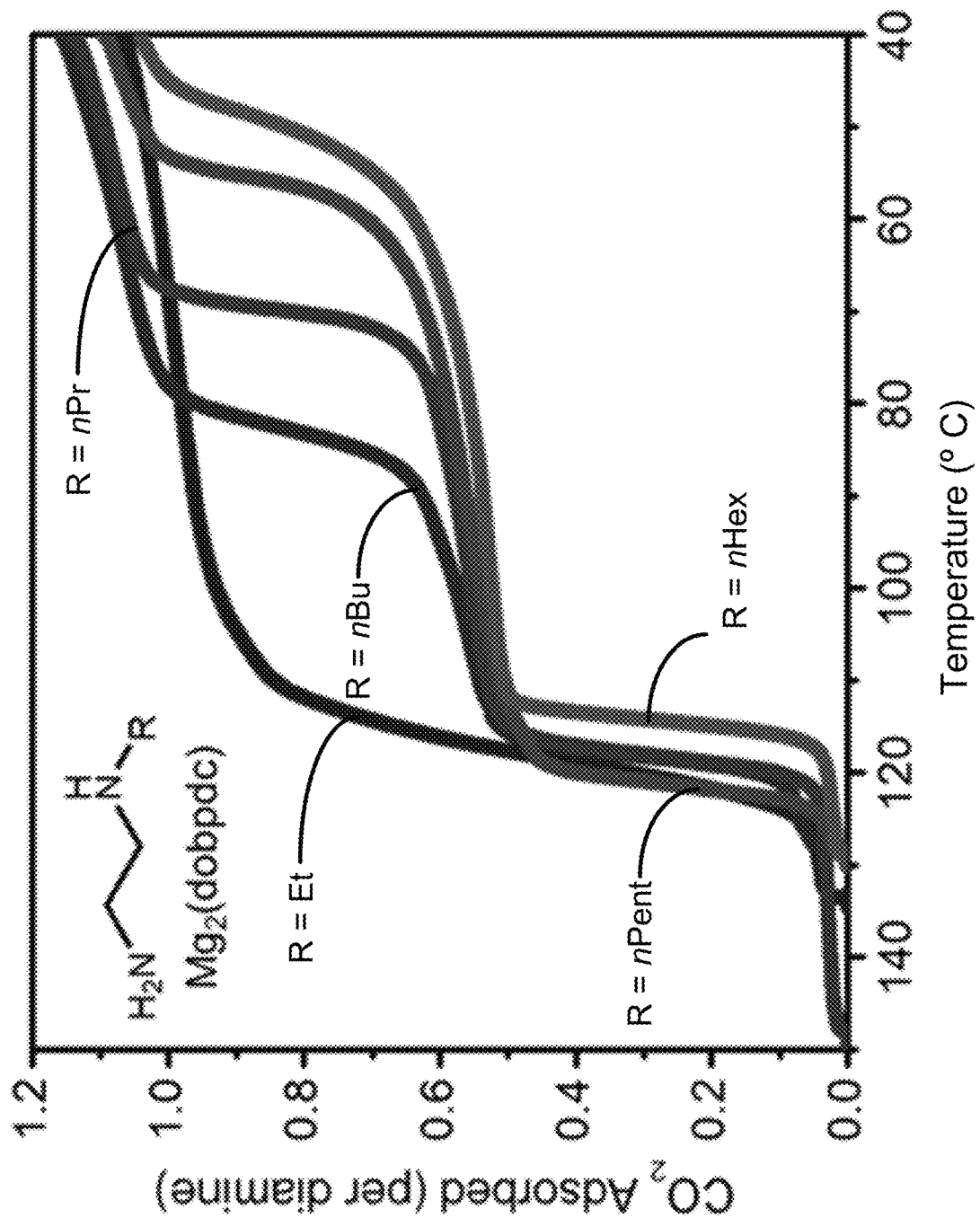
FIG. 2A illustrates pure $CO_2$ adsorption isobars for a series of 1°,2°-alkylethylenediamine-appended variants of $Mg_2$(dobpdc) bearing linear alkyl groups in which the lower temperature $CO_2$ adsorption step moves to successively lower temperatures as the substituent size increases, in accordance with the present disclosure.

Comparing the adsorption and desorption step temperatures for the family of 1°,2°-alkylethylenediamines provides insight into the effect of the alkyl group size on the positions of the two steps (FIG. 2). The higher temperature adsorption steps occur at similar temperatures for the series of diamines with linear alkyl groups (inflection points: Et=119° C.; nPr=117° C.; nBu=119° C.; nPent=121° C.; nHex=114° C.) (FIG. 2a). Consistent with this finding, the first $CO_2$ adsorption steps in the 40° C. $CO_2$ isotherms of these adsorbents all occur at approximately 0.5 mbar. Likewise, the higher temperature $CO_2$ desorption steps are also at similar temperatures (inflection points: e-2=131° C.; nPr-2=126° C.; nBu-2=127° C.; nPent-2=133° C.; nHex-2=131° C.). In contrast, the second $CO_2$ adsorption step temperatures steadily decrease as the size of the alkyl group increases (inflection points: nPr=81° C.; nBu=70° C.; nPent=56° C.; nHex=48° C.) (FIG. 2a), as do the $CO_2$ desorption step temperatures (nPr=88; nBu=78; nPent=65° C.; nHex=65° C.). Therefore, the steric encumbrance of the 2° amine does not significantly affect the thermodynamics of $CO_2$ adsorption/desorption during the higher temperature step, but does significantly influence the lower temperature adsorption step. A similar trend was observed with 1°,2°-alkylpropylenediamines.

Figure 2B:
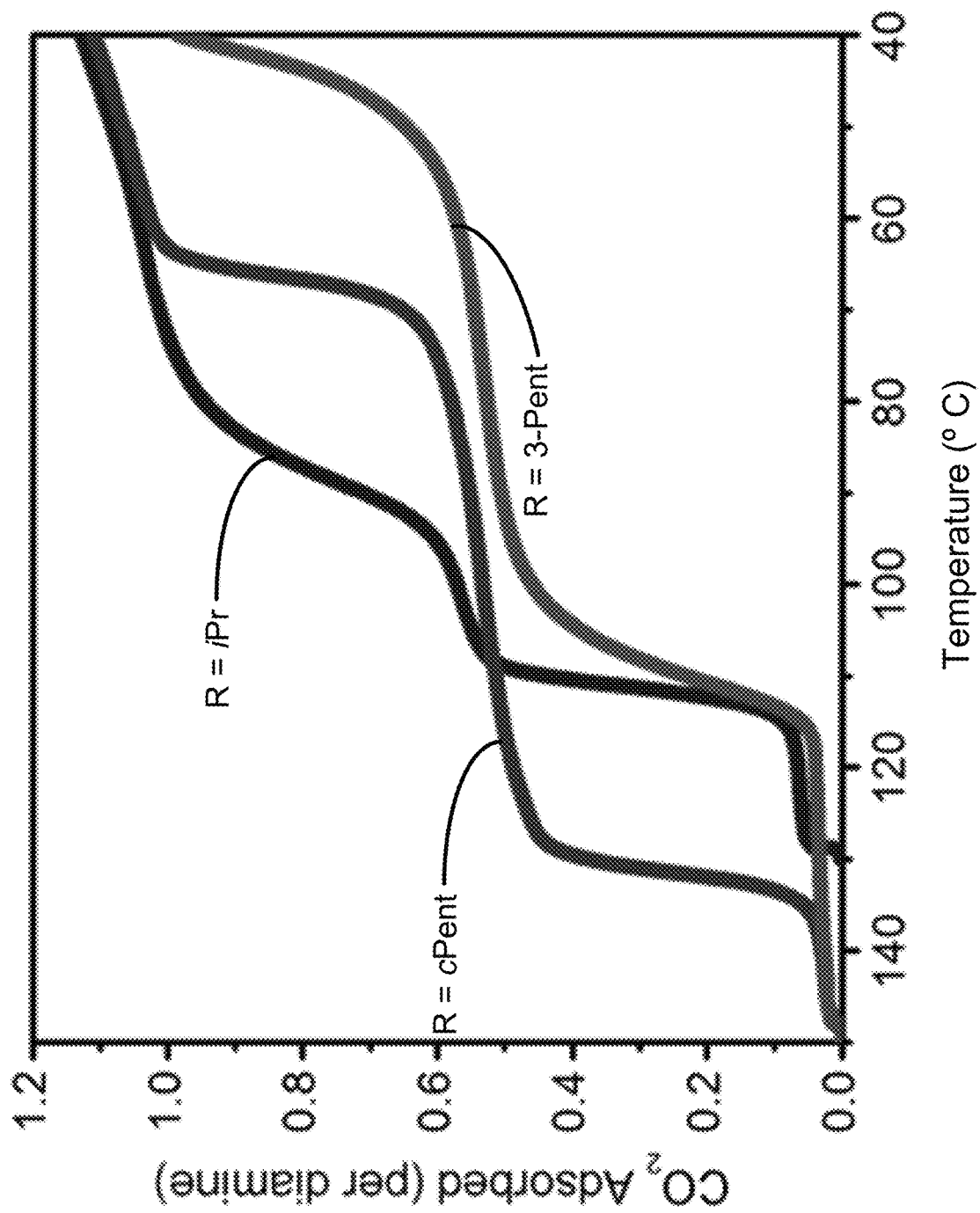
FIG. 2B illustrates pure $CO_2$ adsorption isobars for a series of 1°,2°-alkylethylenediamine-appended variants of $Mg_2$(dobpdc) bearing branched alkyl groups in which the lower temperature $CO_2$ adsorption step moves to successively lower temperatures as the substituent size increases, in accordance with the present disclosure.
Figure 3A:
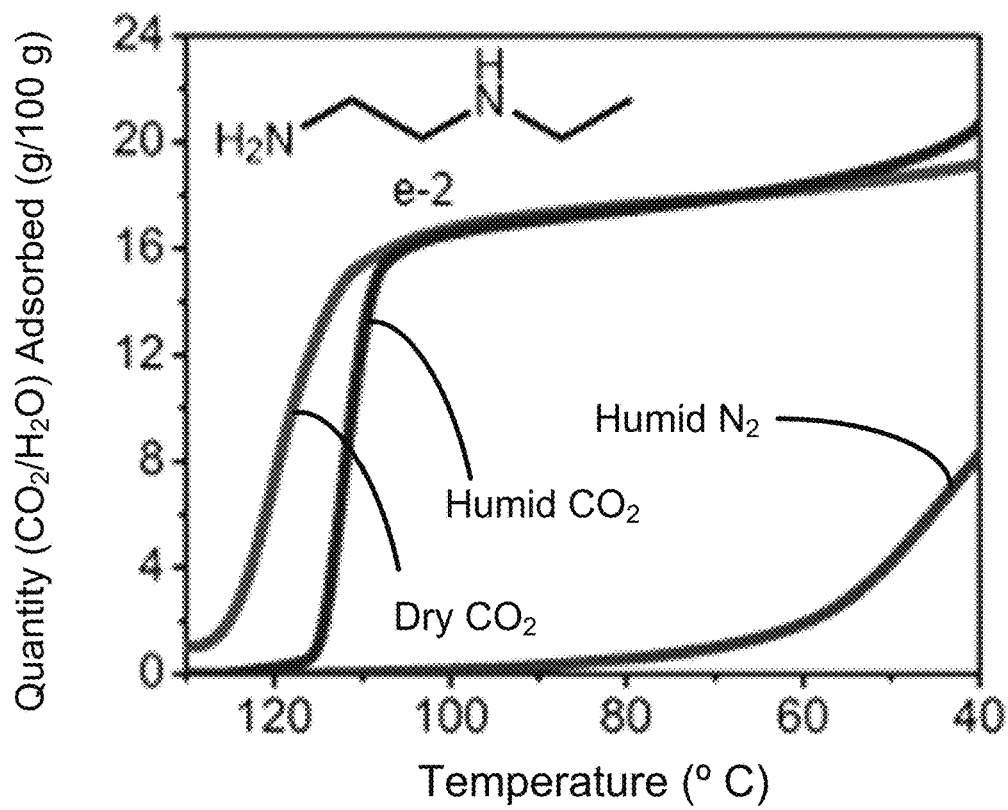
FIGS. 3A, 3B, 3C, 3D, and 3E illustrate dry $CO_2$, humid $CO_2$, and humid $N_2$ (purple) adsorption isobars for a series of 1°,2°-alkylethylenediamine-appended variants of $Mg_2$(dobpdc), as well as EMM-50(ee-2) (ee-2-$Mg_2$(dobpdc)) for comparison, in accordance with the present disclosure.
Figure 3A:
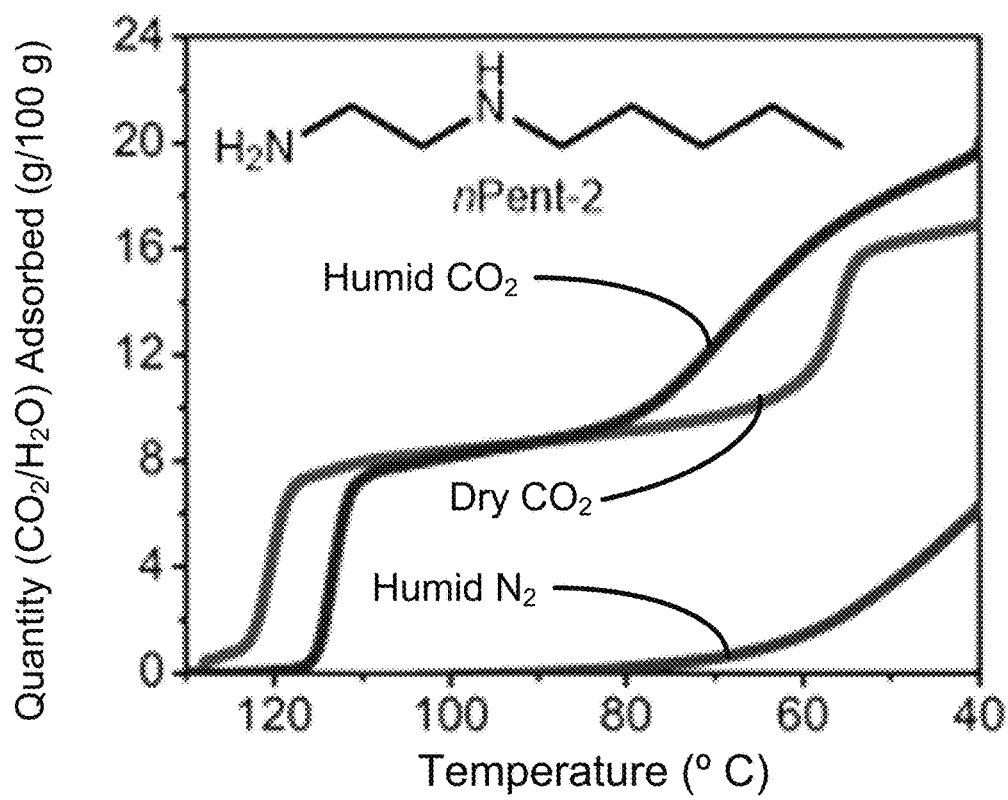
Figure 3B:
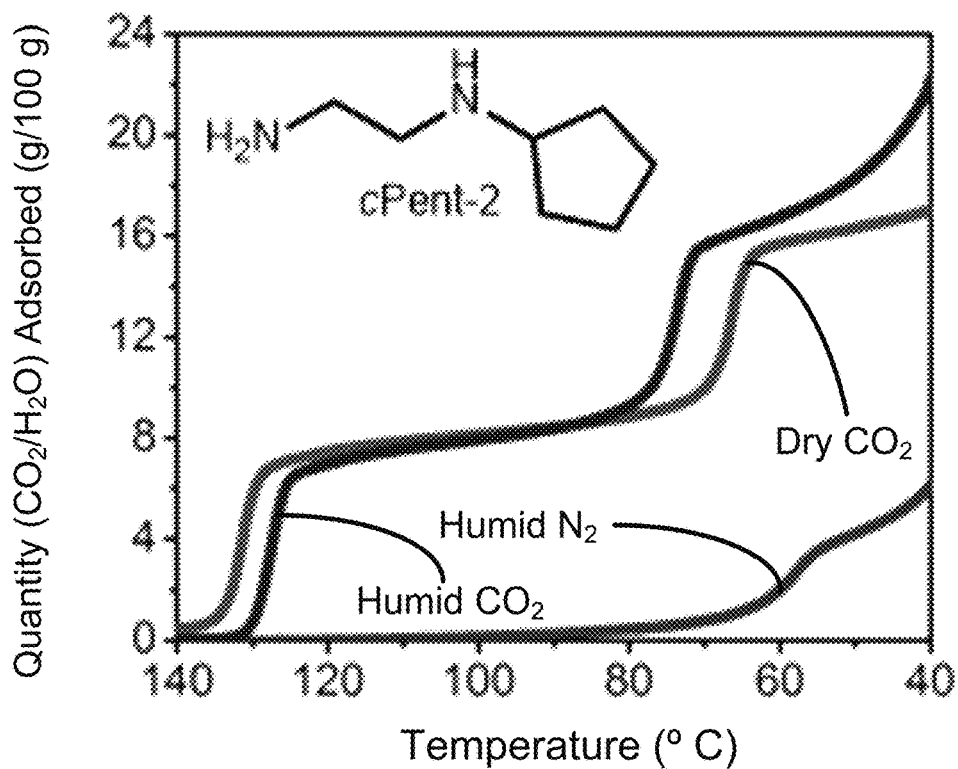
Figure 3B:
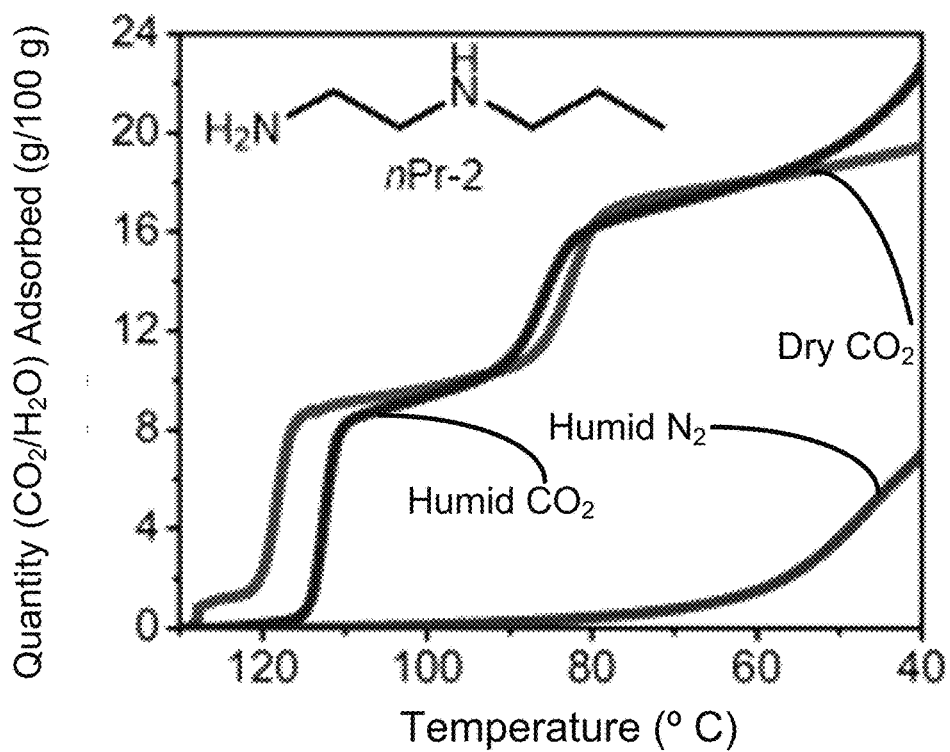
Figure 3C:
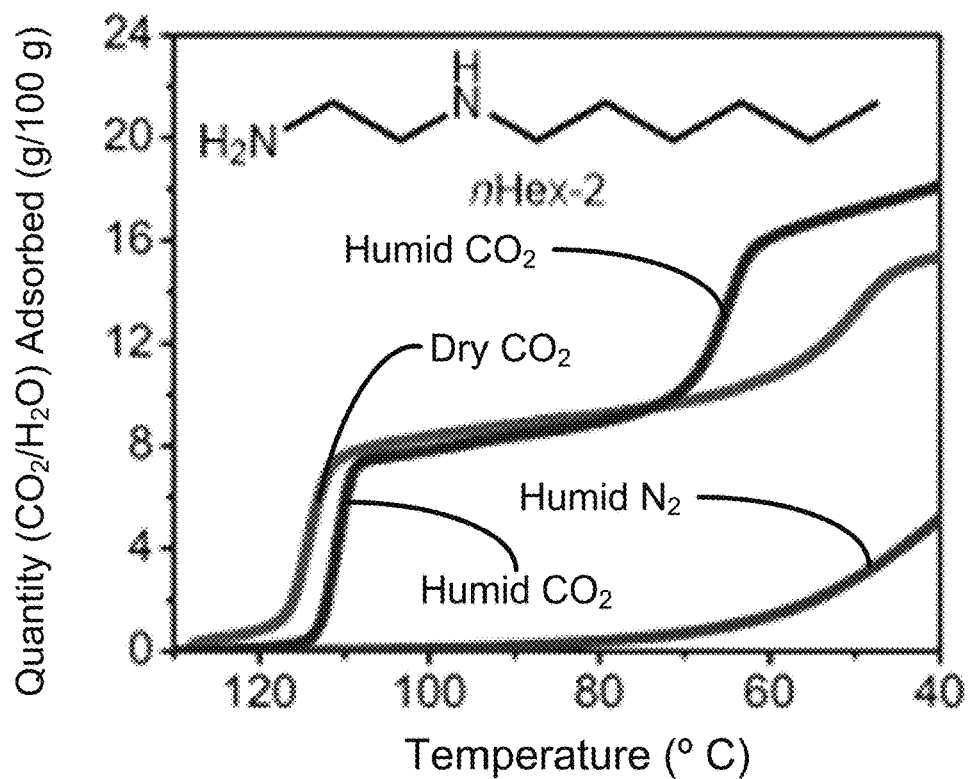
Figure 3C:
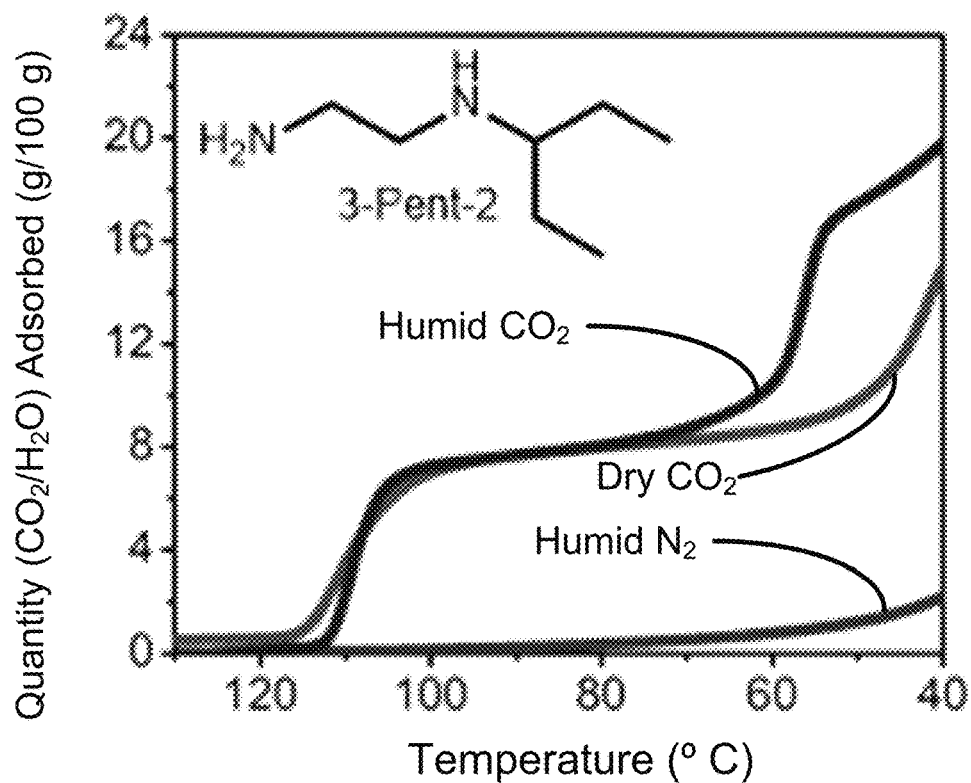
Figure 3D:
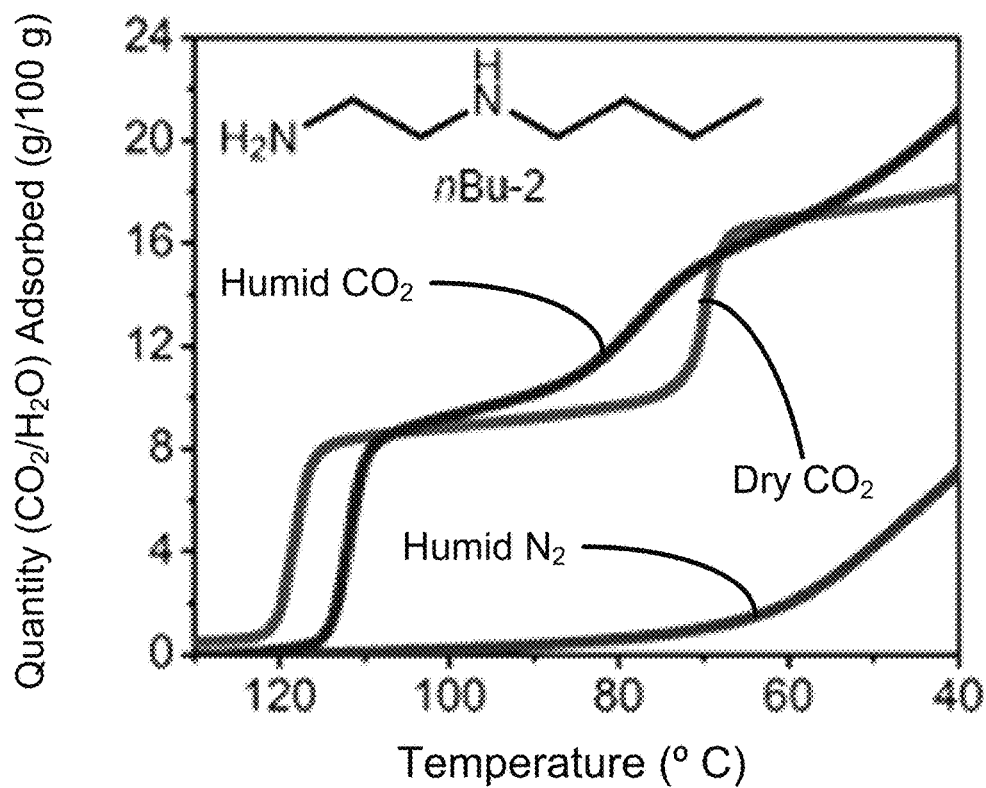
Figure 3D:
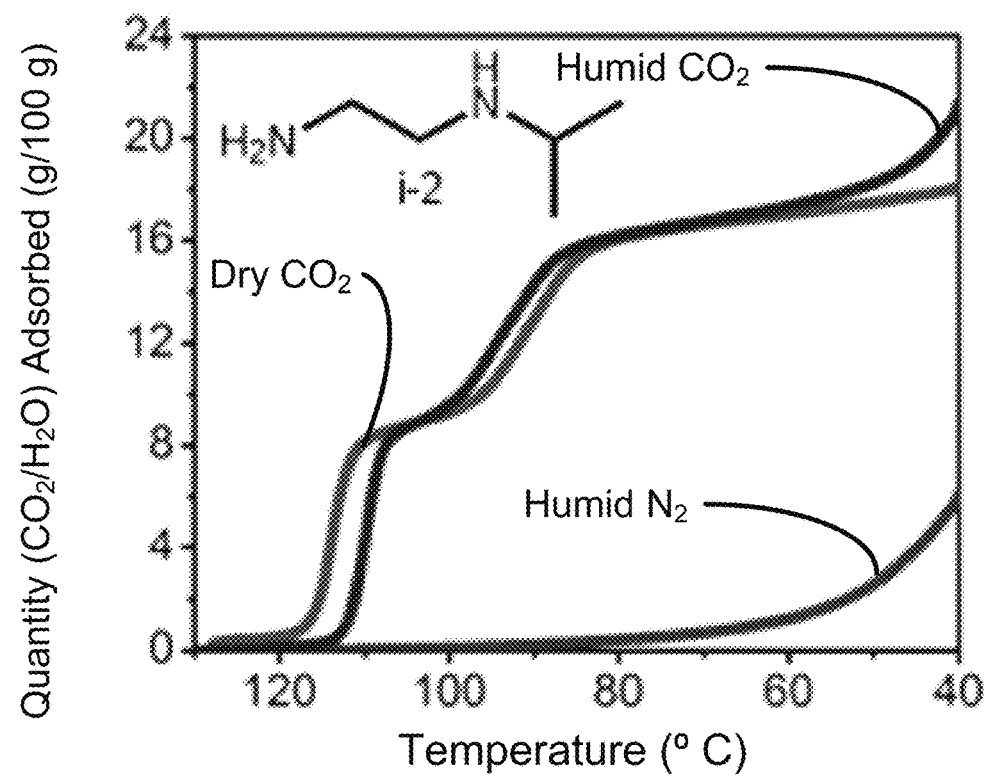
Figure 3E:
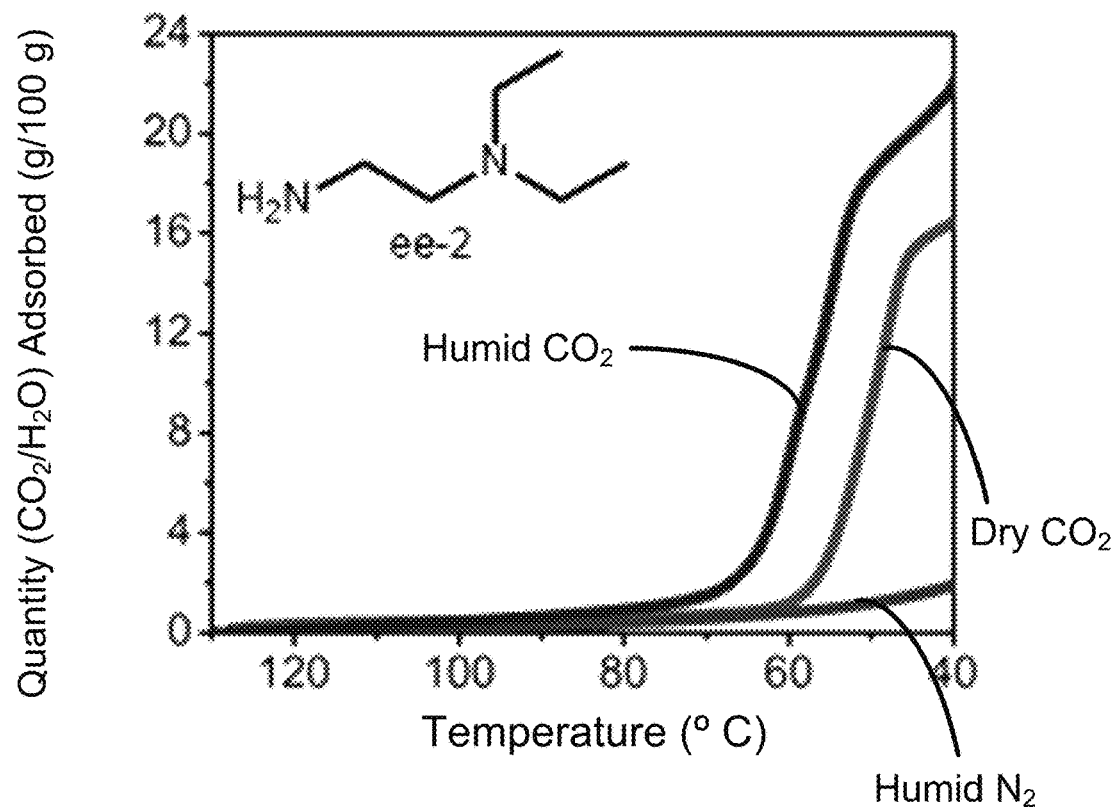

A related trend can be observed in the corresponding series of branched 1°,2°-alkylethylenediamines (FIG. 2b). The inflection point of the first adsorption step occurs at a similar temperature for EMM-50(i-2) (i-2-Mg$_2$(dobpdc)) (114° C.) and EMM-50(3-Pent-2) (3-Pent-2-Mg$_2$(dobpdc)) (111° C.), whereas the second $CO_2$ adsorption step occurs at a lower temperature for the bulkier 3-Pent-2 (42° C.) than for i-2 (91° C.). Notably, EMM-50(cPent-2) (cPent-2-Mg$_2$(dobpdc)) possesses a considerably higher adsorption step temperature (inflection point at 129° C.) than the other 1°,2°-alkylethylenediamines, reflecting more thermodynamically favorable adsorption of $CO_2$ in this material (FIG. 2b). This is likely due to more efficient packing of the cyclopentyl groups in the ammonium carbamate chains compared to other alkyl substituents. Nonetheless, the inflection point of the second $CO_2$ adsorption step for this material occurs at 66° C., which is between that of the smaller i-2 (91° C.) and larger 3-Pent-2 (42° C.). Therefore, these three diamines also follow the trend of decreasing temperatures for the second $CO_2$ adsorption step with increasing steric bulk of the alkyl substituent on the diamine.

Increased Water Co-Adsorption with Adsorbents Displaying Two $CO_2$ Adsorption Steps.

Despite the undesirable two-step $CO_2$ adsorption/desorption profiles of bulky diamine-appended variants of Mg$_2$(dobpdc), their high thermal stabilities led us to evaluate their applicability for $CO_2$ capture under humid conditions. The co-adsorption of water upon cooperative $CO_2$ adsorption in diamine-appended metal-organic frameworks can be rapidly assessed using humid TGA isobaric experiments, wherein the incident gas stream is bubbled through water before reaching the adsorbent. One downside of these measurements is that the identity of the adsorbed species cannot be definitively established. Nonetheless, direct comparison of the wet and dry $N_2$ and $CO_2$ adsorption isobars provides insight into the ability of these adsorbents to capture $CO_2$ under humid conditions. The results of these studies are summarized in FIGS. 3-4.

Figure 4:
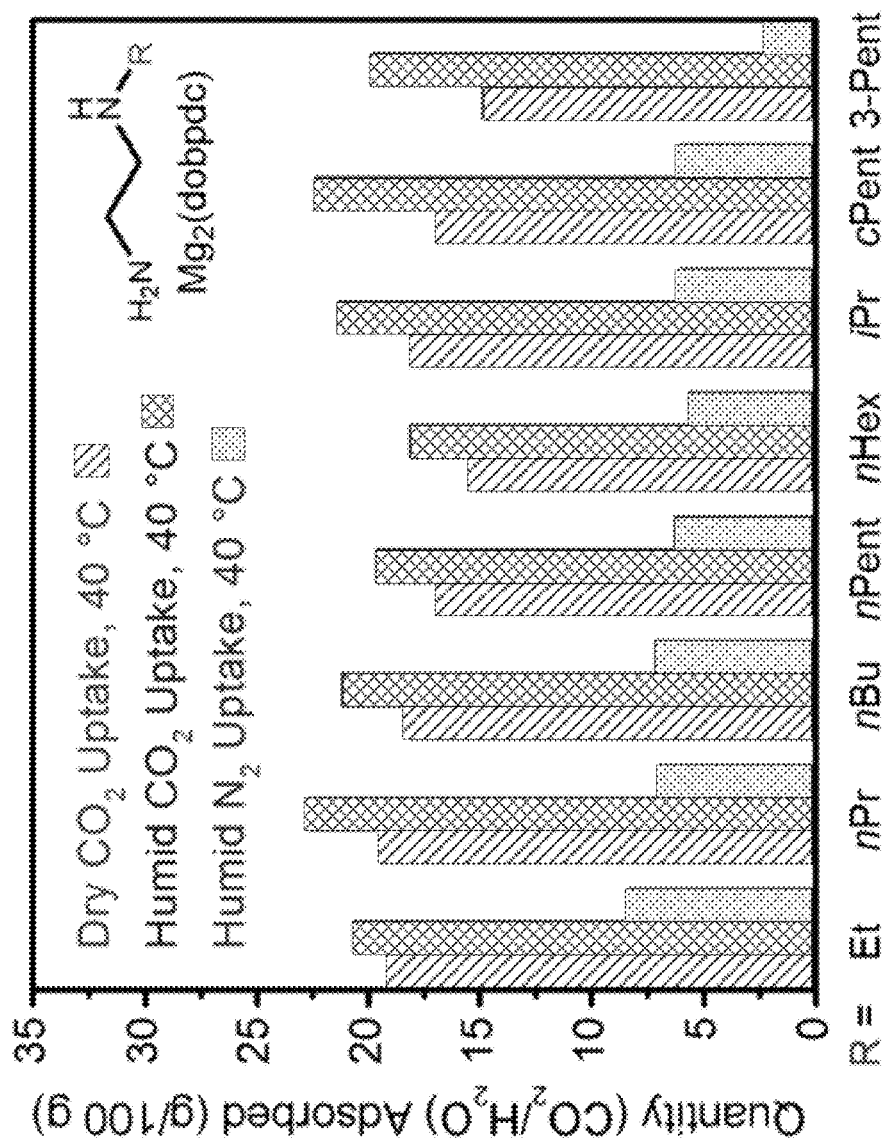
FIG. 4 provides a summary of the adsorption capacities from FIG. 3 at 40° C. for a series of 1°,2°-alkylethylenediamine-appended variants of $Mg_2$(dobpdc) under dry $CO_2$, humid $CO_2$, and humid $N_2$ conditions, in accordance with the present disclosure.

All of the 1°,2°-alkylethylenediamine-appended Mg$_2$(dobpdc) variants exhibited minimal diamine loss upon activation under humid $N_2$ at high temperatures (130-150° C.). Activation of Mg$_2$(dobpdc) variants appended with 2°,2° diamines such as N,N'-dimethylethylenediamine and N,N'-diethylethylenediamine under flowing humid $N_2$ at high temperatures (130-150° C.) for extended periods of time led to substantial diamine volatilization from the $Mg^{2+}$ sites. This is likely due to the weaker M-N bonds in these adsorbents compared to those with 1° amines bound to the metal sites. Cooling the adsorbents under a humid $N_2$ stream (FIG. 3) allowed for the amount of water adsorption to be estimated due to the minimal $N_2$ adsorption of these materials. See, Drisdell et al., 2015, Phys Chem Chem Phys 17, p. 2144; Lee et al., 2015, Chem. Sci. 6, p. 3697; and Lee et al., 2014, Energy Environ. Sci. 7, p. 744. Water adsorption decreased as the size of the alkyl group increased, moving from e-2 (approximately 8.3 g/100 g=4.6 mmol/g water adsorbed at 40° C.) to 3-Pent-2 (approximately 2.2 g/100 g=1.2 mmol/g water adsorbed at 40° C.) (FIG. 4). This effect is likely due to the decreased ability of the unbound amine to hydrogen bond with water as the hydrophobic substituent becomes larger, as was previously observed in single-component $H_2O$ adsorption isotherms.[14b]

Most importantly for CCS applications, all of the 1°,2°-alkylethylenediamine-appended Mg$_2$(dobpdc) variants displayed step-shaped adsorption of $CO_2$ in the presence of water (Humid $CO_2$ curves, FIG. 3). In all cases, the higher temperature step occurred at a similar or slightly lower (<10° C. difference) temperature and was similar in height under humid $CO_2$ compared to dry $CO_2$. In contrast, for the 1°,2°-alkylethylenediamines displaying two-step $CO_2$ adsorption profiles, the lower temperature step typically occurred at higher temperatures under humid conditions (FIG. 3). This is likely due to the stabilizing effect of water on the second set of ammonium carbamate chains (Ünveren et al., 2017, Petroleum 3, p. 37; Didas et al., 2014, Phys. Chem. Lett. 5, p. 4194; Bacsik et al., 2011, Langmuir 27, p. 11118; and Sayari and Belmabkhout, 2010, J. Am. Chem. Soc. 132, p. 6312; Serna-Guerrero et al., 2008, Ind. Eng. Chem. Res. 47, p. 9406) which should be less thermodynamically stable than those originating from the higher temperature $CO_2$ adsorption step. Consistent with this hypothesis, EMM-50(ee-2) (ee-2-Mg$_2$(dobpdc)) (FIG. 3) and EMM-50(pyrr-2) (pyrr-2-Mg$_2$(dobpdc)), which form less thermodynamically stable ammonium carbamate chains than 1°,2°-alkylethylenediamines, also display higher $CO_2$ adsorption step temperatures under humid conditions compared to dry conditions.

Differences between the total mass uptake under dry and humid $CO_2$ streams can be attributed primarily to water co-adsorption (FIG. 4). Although we hypothesized that increasing the size of the alkyl substituent might lead to decreased water co-adsorption, the smallest diamine in this series (e-2) showed the least difference between these two curves, with approximately 1.5 g/100 g (0.2 molecules of water per diamine) of additional mass uptake under humid conditions (FIG. 4). In contrast, all of the bulkier 1°,2°-alkylethylenediamines that display two $CO_2$ adsorption steps co-adsorb more water per diamine at 40° C. (FIG. 4). For example, this increased degree of water co-adsorption led to a higher gravimetric discrepancy between the wet and dry $CO_2$ isobars for EMM-50 (n-Hex-2-Mg$_2$(dobpdc)) (2.8 g/100 g, 0.5 molecules of water per diamine) compared to the smaller EMM-50(e-2) (e-2-Mg$_2$(dobpdc)) (1.5 g/100 g, 0.2 molecules of water per diamine). Notably, 1°,3°-alkyl-ethylenediamine-substituted variants of Mg$_2$(dobpdc) showed even more dramatic water co-adsorption (>4 g/100 g if all water) when cooled under humid $CO_2$, confirming that less stable ammonium carbamate chains display increased proclivity towards favorably interacting with water (FIG. 3). Therefore, the increased water co-adsorption displayed by bulky 1°,2°-alkylethylenediamine-appended variants of Mg$_2$(dobpdc) is likely a direct result of the less stable ammonium carbamate chains corresponding to the lower temperature $CO_2$ adsorption steps. In contrast, EMM-50(e-2) (e-2-Mg$_2$(dobpdc)) likely forms stable, tightly packed chains that present minimal surface for hydrogen-bonding or ion-dipole interactions with water. Nonetheless, in all cases minimal water co-adsorption was observed at temperatures >60° C., suggesting that water co-adsorption can, in general, be minimized by adsorbing $CO_2$ from humid streams at higher temperatures.

Adsorption/Desorption Cycling Under Humid Conditions.

Figure 5:
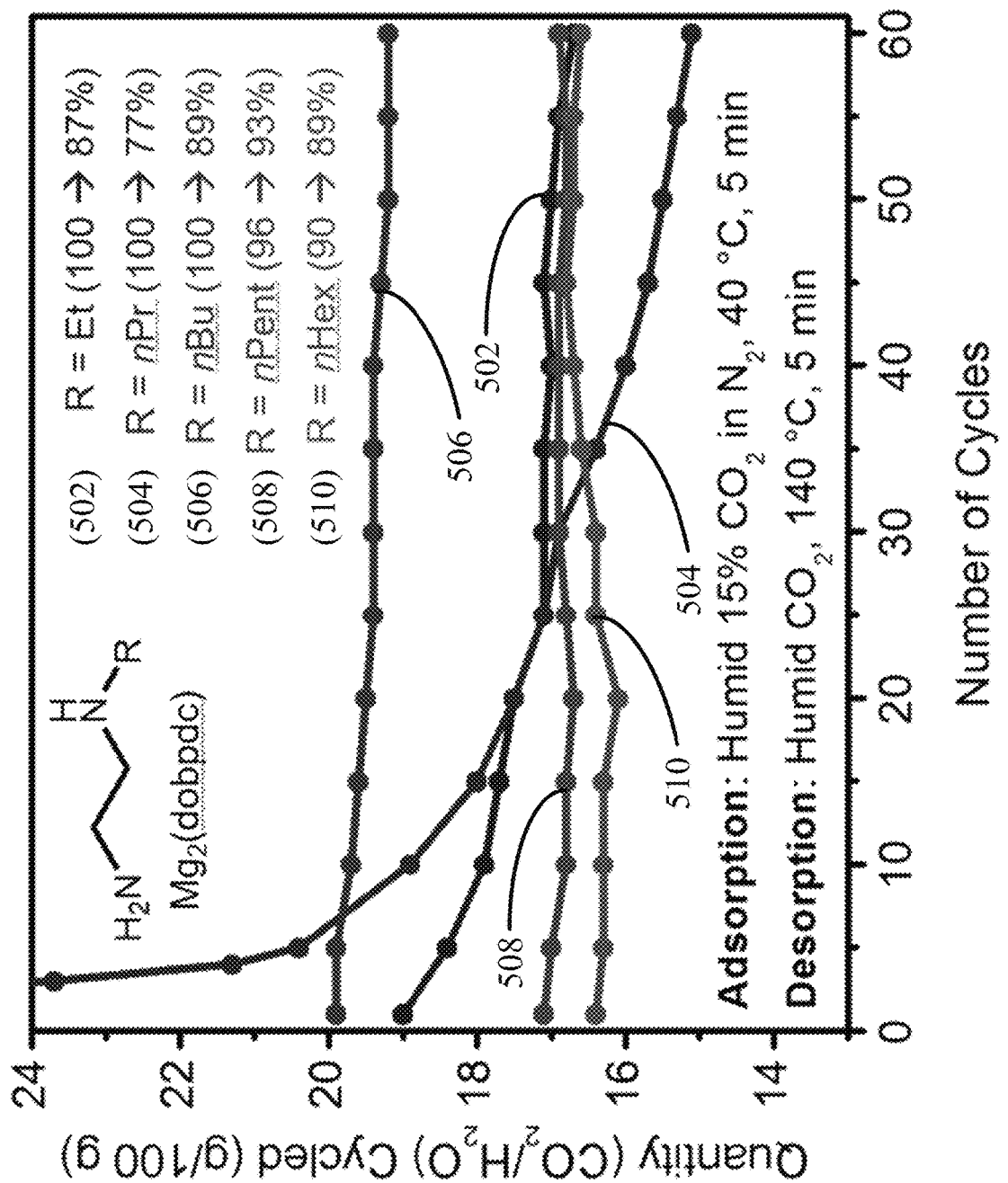
FIG. 5 illustrates cycling stability of 1°,2°-alkylethylenediamine-appended variants of $Mg_2$(dobpdc) in a simulated CCS process in which the diamine loadings before and after 60 cycles are indicated in each case in the upper right corner, in accordance with the present disclosure.

In order to assess whether increasing the size of the alkyl group on the diamine leads to improved stability to diamine loss in a temperature swing adsorption process, we subjected the 1°,2°-alkylethylenediamine-appended variants of Mg$_2$(dopbdc) to adsorption/desorption cycling under humid conditions (FIG. 5). Although EMM-50(e-2) (e-2-Mg$_2$(dobpdc)) displays a sharp $CO_2$-adsorption step and minimal water co-adsorption under humid conditions, its propensity towards diamine loss during adsorption/desorption cycling precludes it from being useful for CCS applications (FIG. 5). For example, cycling this material from adsorption under a simulated coal flue gas stream (humid 15% $CO_2$ in $N_2$, 40° C., 5 min) to desorption under humid pure $CO_2$ (140° C., 5 min) led to approximately 13% diamine loss after 60 cycles (0.2% loss per cycle). As noted above, increasing the molecular weight of the diamine increases its thermal stability towards diamine loss. With the exception of nPr-2 (23% loss over 60 cycles), diamine loss was reduced upon cycling Mg$_2$(dobpdc) functionalized with the larger congeners of e-2, namely nBu-2 (11%), nPent-2 (3%), and nHex-2 (1%). In addition, the $CO_2$/$H_2O$ cycling capacities of EMM-50(nPent-2) (nPent-2-Mg$_2$(dobpdc)) and EMM-50 (nHex-2-Mg$_2$(dobpdc)) remained very stable over 60 adsorption/desorption cycles. A similar trend was observed with branched alkyl groups (i-2: 24%; cPent-2: 8%; 3-Pent-2: 5% diamine loss over 60 cycles). As a consequence, Mg$_2$(dobpdc) variants functionalized with the larger diamines in this study, such as nPent-2 and n-Hex-2, display the most stable adsorption/desorption cycling and thus are the most suitable for long-term application in a CCS process.

Origin of Two $CO_2$ Adsorption Steps with Bulkier Diamines.

Figure 6:
FIG. 6 illustrates a proposed structure of the intermediate formed after the first adsorption step (50% capacity) of i-2-$Zn_2$(dobpdc), which is isostructural to EMM-50(i-2) (i-2-$Mg_2$(dobpdc)), where as illustrated, $CO_2$ inserts into the Zn—N bonds to form ammonium carbamate chains along alternating rows of metal sites down the pore axis (c), this presumably occurs due to disfavorable interactions between paired diamine sites in the a-b plane, the second adsorption step leading to 100% capacity proceeds via insertion at the remaining diamine sites, in accordance with an embodiment of the present disclosure.

The previously reported single crystal X-ray diffraction structures of the framework Zn$_2$(dobpdc) and its diamine-appended variants, which are isostructural to their Mg analogues, provide a likely explanation for the origin of the two-step adsorption behavior observed with bulky alkylethylenediamines (FIG. 6). The hexagonal channels of Zn$_2$(dobpdc) are not uniform; instead, they possess three sets of paired Zn$^{2+}$ centers pointing at one another. As a consequence, pairs of proximal diamines run down the c-axis, with larger alkyl groups on the 2° amine leading to increasingly disfavorable steric interactions between adjacent sets of diamines. These unfavorable interactions would be exacerbated in the ammonium carbamate phase, in which $CO_2$—insertion into the M-N bond moves the alkyl-substituted amines closer to one another. Therefore, we hypothesize that for adsorbents demonstrating two $CO_2$ adsorption steps, the higher temperature step corresponds to formation of ammonium carbamate chains at half of the metal sites, as illustrated in FIG. 6. The formation of ammonium carbamate chains at one site would disfavor $CO_2$ insertion into the adjacent site, necessitating an increase in the driving force for adsorption (e.g. decreasing the temperature in isobaric measurements or increasing the pressure in isothermal measurements) in order to facilitate formation of the hindered ammonium carbamate chain. Increasing the size of the substituent on the unbound amine would steadily decrease the thermodynamic favorability of the second adsorption step. Therefore, an unintended consequence of increasing the size of the alkyl substituents on the diamine is the development of two distinct $CO_2$ adsorption steps resulting from disfavorable interactions in the a-b plane of the framework. Notably, the second-formed set of ammonium carbamate chains would be less thermodynamically stable, and therefore are the most likely binding site for increased water co-adsorption (FIGS. 3-4).

The findings presented thus far suggest two competing trends in the applicability of 1°,2°-alkylethylenediamine-appended variants of Mg$_2$(dobpdc) for CCS: increasing the size of the alkyl group on the 2° amine leads to increased stability to diamine loss upon adsorption/desorption cycling, but also leads to two $CO_2$ adsorption steps due to steric interactions between adjacent sets of diamines in the a-b plane. These destabilizing interactions diminish the potential adsorption capacities of the materials under flue gas conditions and lead to increased $H_2O$ co-adsorption with $CO_2$ due to the formation of less stable ammonium carbamate chains. Based on these results, we hypothesized that reducing the steric interactions between adjacent diamines should mitigate these two-step $CO_2$ adsorption/desorption profiles and thus lead to materials that combine the best features of the adsorbents described above, namely, stability to adsorption/desorption cycling, one sharp $CO_2$ adsorption step, and minimal water co-adsorption.

Synthesis of the Expanded Framework Mg$_2$(Dotpdc).

Figure 7:
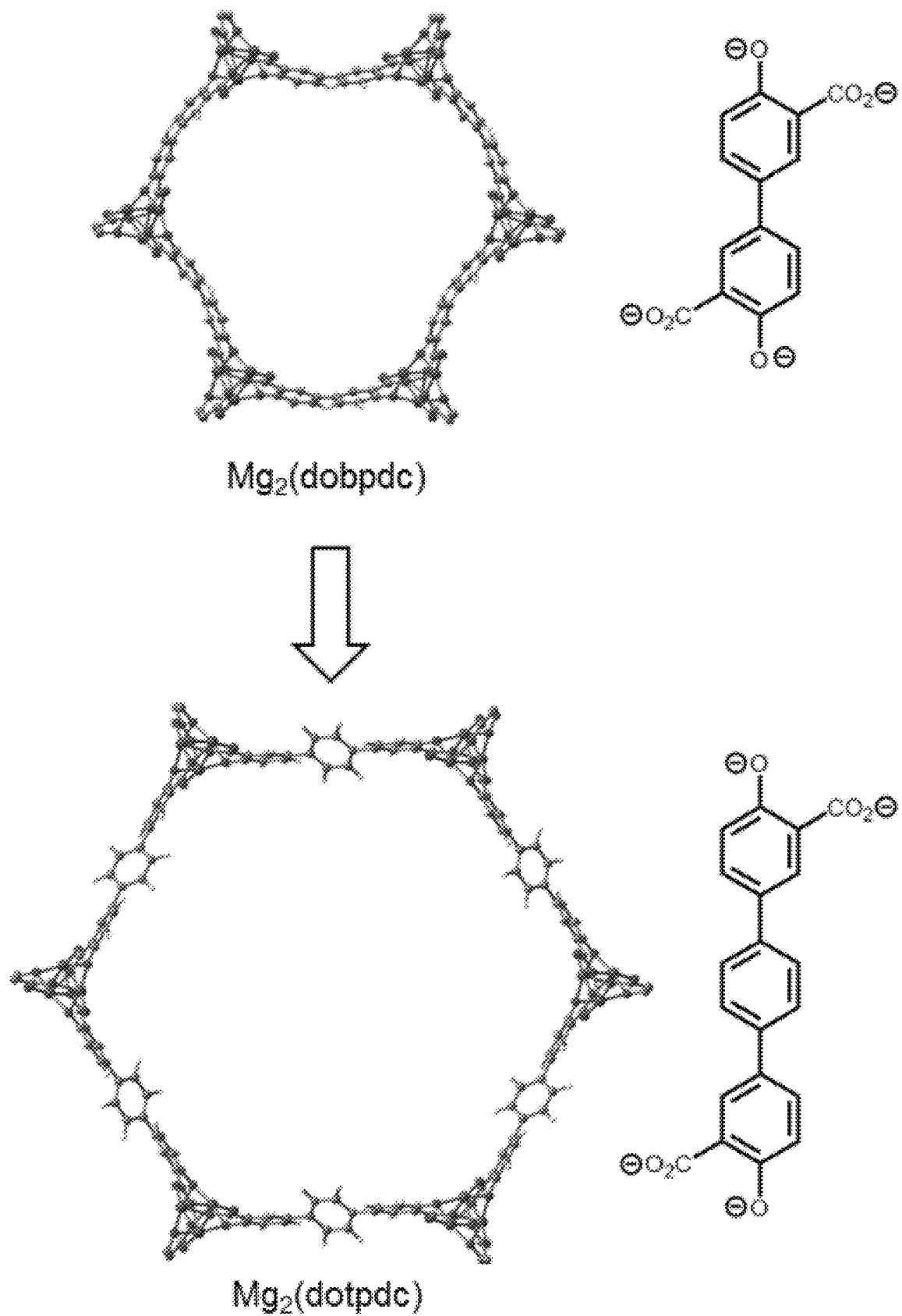
FIG. 7 illustrates the organic linker and putative structure of $Mg_2$(dotpdc) (dotpdc$^{4-}$=4,4"-oxido-[1,1':4',1"-terphenyl]-3,3"-dicarboxylate, in accordance with an embodiment of the present disclosure.

One strategy to minimize unfavorable interactions between adjacent diamines is to change the base framework to an isoreticular structure with a larger spacing between the metal sites in the a-b plane. Specifically, changing the ligand from dobpdc$^{4-}$ to the terphenyl ligand dotpdc$^{4-}$ (4,4"-oxido-[1,1':4',1"-terphenyl]-3,3"-dicarboxylate) should better separate the ammonium carbamate chains from one another, as the metal centers would be approximately 5 Å farther apart in the a-b plane in Mg$_2$(dotpdc) compared to Mg$_2$(dobpdc) (FIG. 7). See, Xiao et al., 2016, J. Am. Chem. Soc. 138, p. 14371. However, the Mg$^{2+}$ centers in Mg$_2$(dotpdc) should be at a similar distance along the c-axis as in Mg$_2$(dobpdc), as was the case in the corresponding Fe$^{2+}$ framework (See, Xiao et al., 2016, J. Am. Chem. Soc. 138, p. 14371) potentially enabling the cooperative formation of ammonium carbamate chains. Although Mg$_2$(dotpdc) had not been prepared prior to this work, related Fe frameworks have been previously reported (See, Xiao et al., 2016, J. Am. Chem. Soc. 138, p. 14371) as have the Co-based framework and related frameworks incorporating functionalized terphenyl ligands (See, Park and, 2010, Chem. Commun. 46, p. 610, Deng et al., 2012, Science 336, p. 1018; Lim et al., 2017, Inorg. Chem.; Fracaroli et al., 2016, J. Am. Chem. Soc. 138, p. 8352). Gratifyingly, the same solvothermal conditions used to prepare Mg$_2$(dobpdc) from H$_4$dobpdc and Mg(NO$_3$)$_2$.6H$_2$O[14c] (0.55:0.45 MeOH:DMF, 120° C., 14 h) afforded Mg$_2$(dotpdc) in high yield as an off-white crystalline solid. Unfortunately, we have been unable to prepare Mg$_2$(dotpdc) or its metal analogues with sufficient crystallinity to confirm their structures by powder or single crystal X-ray diffraction. Nonetheless, the powder X-ray diffraction pattern of this material is consistent with a pore-expanded framework isoreticular in structure to Mg$_2$(dobpdc). In contrast to many metal-organic frameworks with large pore diameters, Mg$_2$(dotpdc) does not show evidence of pore collapse after evacuation of solvent from the pores (See, Zhou et al., 2012, Chem. Rev. 112, p. 673; Furukawa et al., 2013, Science 341, p. 123044; Eddaoudi et al., 2002, Science 295, p. 469. Bae et al., 2009, Chem. Mater. 21, p. 4768; and Nelson et al., 2009, J. Am. Chem. Soc. 131, p. 458) and cannot form an interpenetrated structure,[16] (Deng et al., 2012, Science 336, p. 1018) leading to a high 77 K N$_2$ Brunauer-Emmett-Teller (BET) surface area of 3103±29 m$^2$/g (Langmuir surface area: 5842±27 m$^2$/g). Additionally, the presence of accessible Mg$^{2+}$ sites in Mg$_2$(dotpdc) was confirmed by the sharp uptake of CO$_2$ at low pressures in the 25, 35, and 45° C. adsorption isotherms. The CO$_2$ differential heat of adsorption ($\Delta h_{ads}$) at low loadings was −40 kJ/mol, as determined from the Clausius-Clapeyron relationship (eq. 2). This $\Delta h_{ads}$ is similar to that of related metal-organic frameworks possessing open Mg$^{2+}$ sites, such as Mg$_2$(dobpdc) (−44 kJ/mol)[14d] (Drisdell et al., 2015, Phys Chem Chem Phys 17, p. 2144;) and Mg$_2$(dobdc) (dobdc$^{4-}$=2,5-dioxido-1,4-benzenedicarboxylate) (−42 kJ/mol) (Mason et al., 2011, Energy Environ. Sci. 4, p. 3030).

CO$_2$ Adsorption, Water Co-Adsorption, and Adsorption/Desorption Cycling in 1°,2°-alkylethylenediamine-Appended Variants of Mg$_2$(Dotpdc).

The bulky 1°,2°-alkylethylenediamines that display two CO$_2$ adsorption steps in Mg$_2$(dobpdc) were grafted to Mg$_2$(dotpdc) in order to determine if single CO$_2$ adsorption steps could be achieved. The standard grafting procedure led to >100% diamine loading in most cases due to the presence of excess diamine in the large pores of Mg$_2$(dotpdc). Therefore, the activation temperatures of diamine-appended variants of Mg$_2$(dotpdc) were carefully optimized based on N$_2$ decomposition curves to facilitate complete removal of the excess diamines from the pores without loss of the metal-bound diamines. Using this strategy, Mg$_2$(dotpdc) variants functionalized with the bulky 1°,2°-alkylethylenediamines shown in FIG. 2 (including nHept-2) were prepared with high diamine loadings (>90%) remaining after activation. However, to date we have been unable to reproducibly prepare high quality samples of EMM-51(e-2) (e-2-Mg$_2$(dotpdc)), possibly due to degradation of the framework upon exposure to this diamine.

Figure 8A:
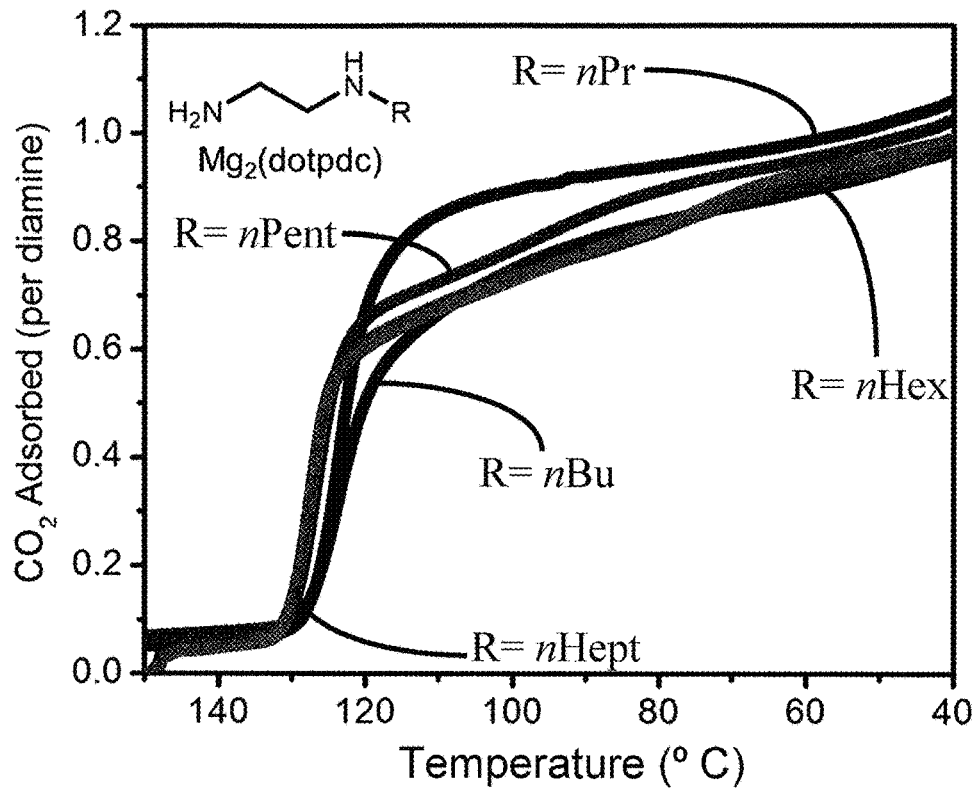
FIGS. 8A and 8B illustrate pure $CO_2$ adsorption isobars for a series of 1°,2°-alkylethylenediamine-appended variants of $Mg_2$(dotpdc) bearing a) linear and b) branched alkyl groups, in accordance with an embodiment of the present disclosure.
Figure 8B:
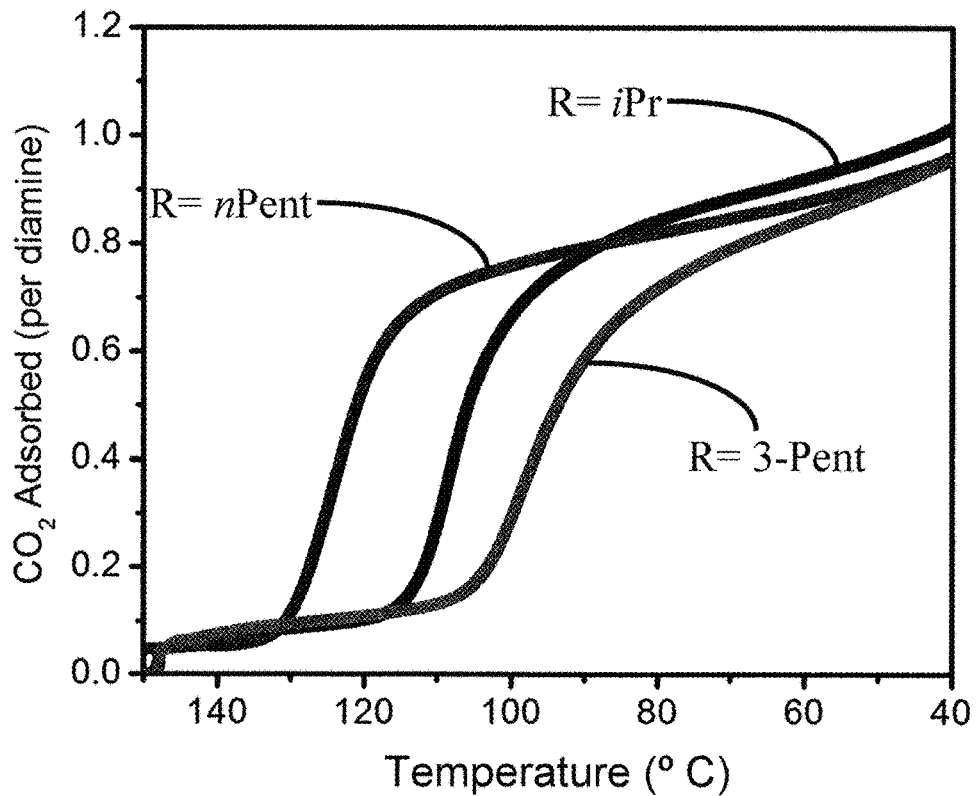
Figure 9:
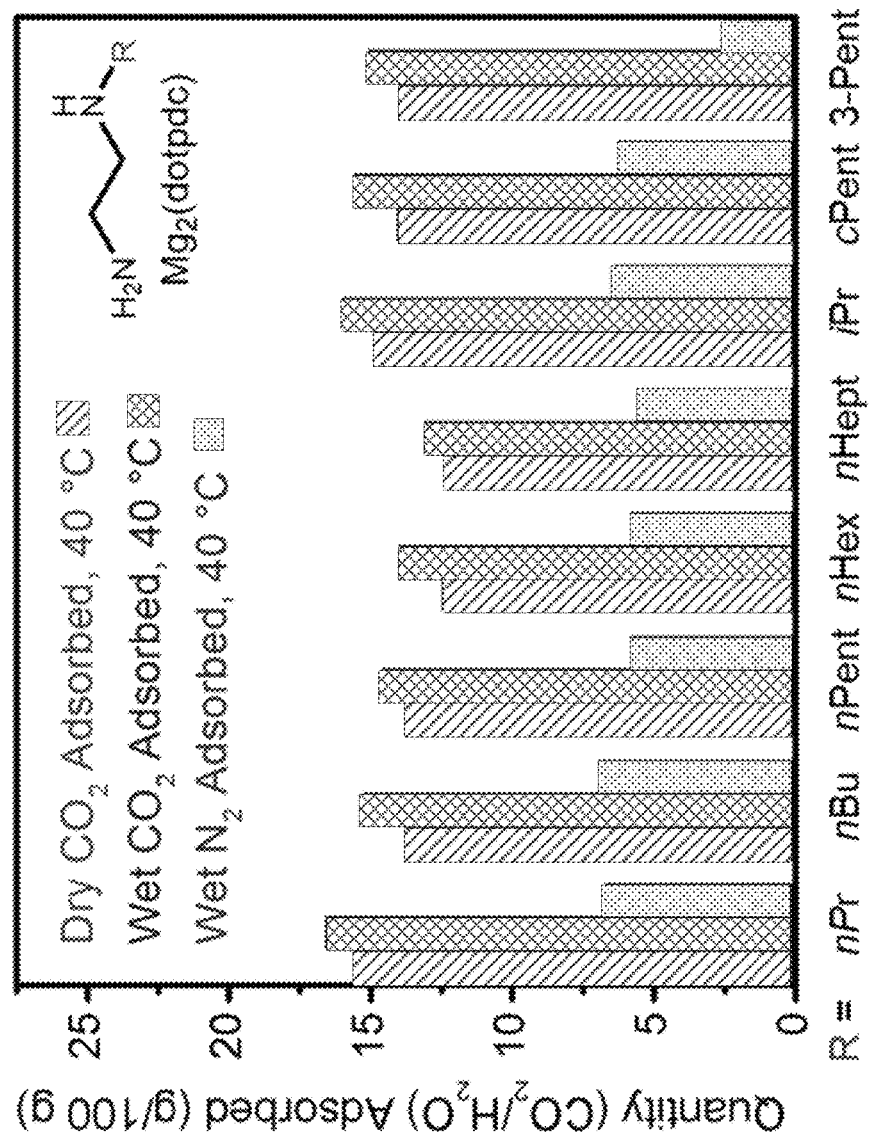
FIG. 9 provides a summary of the adsorption capacities at 40° C. for a series of 1°,2°-alkylethylenediamine-appended variants of $Mg_2$(dotpdc) under dry $CO_2$, humid $CO_2$, and humid $N_2$ conditions, in accordance with an embodiment of the present disclosure.

Consistent with our hypothesis regarding the origin of the two-step CO$_2$ adsorption/desorption behavior in Mg$_2$(dobpdc), all of the 1°,2°-alkylethylenediamine-appended variants of Mg$_2$(dotpdc) exhibit a single CO$_2$ adsorption step in isobaric measurements. In addition, the 40° C. CO$_2$ isotherm of EMM-51 (nHept-2-Mg$_2$(dotpdc)) shows a single step upon CO$_2$ adsorption, confirming that two CO$_2$ adsorption steps were also not observed in equilibrium measurements. In many cases, the CO$_2$ adsorption steps were shorter than expected, which is likely due to poor crystallinity and/or the presence of defects in this framework impeding the complete formation of ammonium carbamate chains. Similar to the higher temperature steps observed in Mg$_2$(dobpdc), the CO$_2$ adsorption steps in Mg$_2$(dotpdc) for the 1°,2°-alkylethylenediamines substituted with linear alkyl groups occur at nearly the same temperature (inflection points of the steps: nPr-2=123° C.; nBu-2=126° C.; nPent=126° C.; nHex=127° C.; nHept=127° C.) (FIG. 8a). Notably, the CO$_2$ adsorption step temperatures are approximately 10° C. higher in Mg$_2$(dotpdc) than in Mg$_2$(dobpdc). Given the similarity of the Mg$^{2+}$ centers in Mg$_2$(dobpdc) and Mg$_2$(dotpdc), the slight increase in thermodynamic favorability of CO$_2$ adsorption in Mg$_2$(dotpdc) compared to Mg$_2$(dobpdc) likely results from the elimination of disfavorable steric interactions in the CO$_2$-adsorbed phase in the former framework. In contrast, branching on the alkyl group has a more substantial effect on the CO$_2$ adsorption step. Having found that changing the framework from Mg$_2$(dobpdc) to Mg$_2$(dotpdc) eliminated the problematic two-step adsorption profiles with bulky 1°,2°-alkylethylenediamines, we evaluated their potential for CO$_2$ adsorption under humid conditions. The results of these experiments are summarized in FIG. 9. Because these materials should form a single set of strongly bound ammonium carbamate chains, we predicted that diamines functionalized with hydrophobic alkyl groups should display minimal water co-adsorption upon CO$_2$ adsorption under humid conditions. Gratifyingly, step-shaped adsorption with minimal excess mass uptake between dry and humid conditions at 40° C. was observed for all of the diamine-appended variants of Mg$_2$(dotpdc) (difference between green and blue columns, FIG. 9). For example, EMM-51 (nHept-2-Mg$_2$(dotpdc)) shows the co-adsorption of only approximately 0.8 g/100 g of H$_2$O, corresponding to 0.2 molecules per diamine. Interestingly, this is approximately the same amount of water co-adsorbed per diamine in EMM-50(e-2) (e-2-Mg$_2$(dobpdc)), which also displays a single CO$_2$ adsorption step. Notably, the wet N$_2$ isobars of these materials (purple columns, FIG. 9) confirm that water adsorption occurs readily in the absence of CO$_2$, likely through hydrogen-bonding to the unbound amine. Therefore, the minimal water co-adsorption in these materials is likely due to the formation of highly-stabilized ammonium carbamate chains lined with hydrophobic alkyl groups that exclude H$_2$O. Importantly, the minimal amount of water co-adsorption observed with 1°,2°-alkylethylenediamine-appended variants of Mg$_2$(dotpdc) should diminish the parasitic energy costs associated with H$_2$O desorption in a CCS process.

Figure 10:
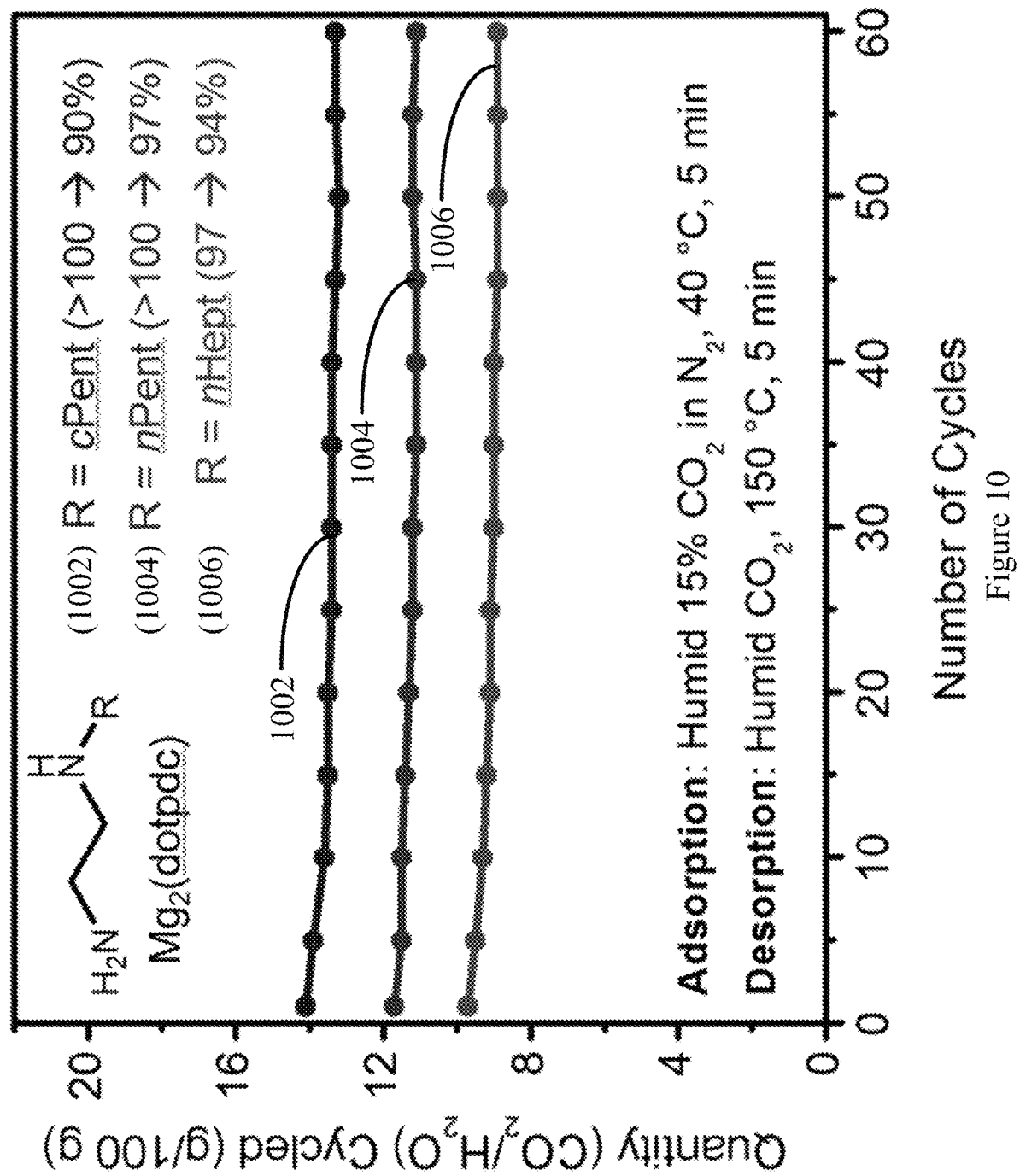
FIG. 10 illustrates cycling stability of 1°,2°-alkylethylenediamine-appended variants of $Mg_2$(dotpdc) in a simulated CCS process in which the diamine loadings before and after 60 cycles are indicated in each case in the upper right corner, in accordance with an embodiment of the present disclosure.

The cycling stabilities of several diamine-appended variants of Mg$_2$(dotpdc) were also assessed (FIG. 10). As with Mg$_2$(dobpdc) (FIG. 5), Mg$_2$(dotpdc) variants functionalized with higher molecular weight diamines displayed greater thermal stability to diamine loss. In addition, EMM-51 (nHept-2-Mg$_2$(dotpdc)) and EMM-51(nPent-2) (nPent-2-Mg$_2$(dotpdc)) showed stable adsorption/desorption cycling with minimal diamine loss (~3%) over 60 cycles. It should be noted that a slightly higher desorption temperature (150° C.) was required in these cycling experiments compared to the corresponding Mg$_2$(dobpdc) variants (140° C.). Given the low degree of water co-adsorption in these materials, the cycling capacities in these experiments are almost entirely due to CO$_2$ adsorption/desorption, and thus demonstrate reasonably high CO$_2$ working capacities (>8 g/100 g, >1.8 mmol/g) for cycling under humid conditions.

Single Crystal X-Ray Diffraction Structure of Zn$_2$(pc-Dobpdc) and Synthesis of Mg$_2$(pc-dobpdc).

Although changing the parent framework from Mg$_2$(dobpdc) to Mg$_2$(dotpdc) eliminated the undesirable two-step CO$_2$ adsorption profiles with bulky 1°,2°-alkylethylenediamines, the use of this framework presents several drawbacks compared to Mg$_2$(dobpdc). These include a) approximately 20% lower gravimetric capacities due to the higher molecular weight of the organic linker and b)

approximately 40% lower volumetric capacities due to the approximately 30% lower crystallographic density of $Mg_2$(dotpdc). See, Gygi et al., 2016, *Chem. Mater.* 28, p. 1128. Determining the crystallographic density of $Mg_2$(dotpdc) has proven difficult due to its poor crystallinity. The ratio of crystallographic densities of $Mg_2$(dotpdc) and $Mg_2$(dobpdc) was estimated from that of the isostructural Fe frameworks. The crystallographic density of activated $Fe_2$(dotpdc) was determined by powder X-ray diffraction to be approximately 0.462 g/cm$^3$ (See, Xiao et al., 2016, *J. Am. Chem. Soc.* 138, p. 14371). The crystallographic density of activated $Fe_2$(dobpdc) was previously determined to be 0.6750 g/cm$^3$ by powder X-ray diffraction (See, Gygi et al., Chem. Mater. 28, p. 1128). Therefore, the crystallographic density of $Fe_2$(dotpdc) is 31% lower than that of $Fe_2$(dobpdc). The 17% lower gravimetric capacity of $Fe_2$(dotpdc) (1 $CO_2$ per $Fe^{2+}$ site=4.52 mmol/g) compared to $Fe_2$(dobpdc) (1 $CO_2$ per $Fe^{2+}$ site=5.46 mmol/g) leads to an approximately 43% lower volumetric capacity in $Fe_2$(dotpdc) (1 $CO_2$ per $Fe^{2+}$ site=2.09 mmol/cm$^3$) compared to that of $Fe_2$(dobpdc) (1 $CO_2$ per $Fe^{2+}$ site=3.69 mmol/cm$^3$). Because the adsorption of $CO_2$ in diamine-appended metal-organic frameworks occurs in a ratio of one $CO_2$ per metal site, and the functionalization of the framework has a minimal effect on the unit cell, these ratios should roughly translate to diamine-appended variants. Accordingly, a framework with a similar crystallographic density as $Mg_2$(dobpdc) capable of overcoming the unfavorable steric interactions between adjacent ammonium carbamate chains was sought. As noted above, the distorted hexagonal pores of $Mg_2$(dobpdc) result in paired sets of adjacent ammonium carbamate chains pointing towards one another. This distorted pore structure is illustrated by the N,N-dimethylacetamide (DMA) solvent molecules in the single-crystal X-ray diffraction structure of the isostructural $Zn_2$(dobpdc)(DMA)$_2$ (FIG. 11) and is responsible for the observed two-step $CO_2$ adsorption/desorption profiles. In contrast, a framework with uniform hexagonal channels would not possess these paired sets of metal sites in the a-b plane and therefore would display decreased steric interactions between adjacent diamine sites.

Figure 11:
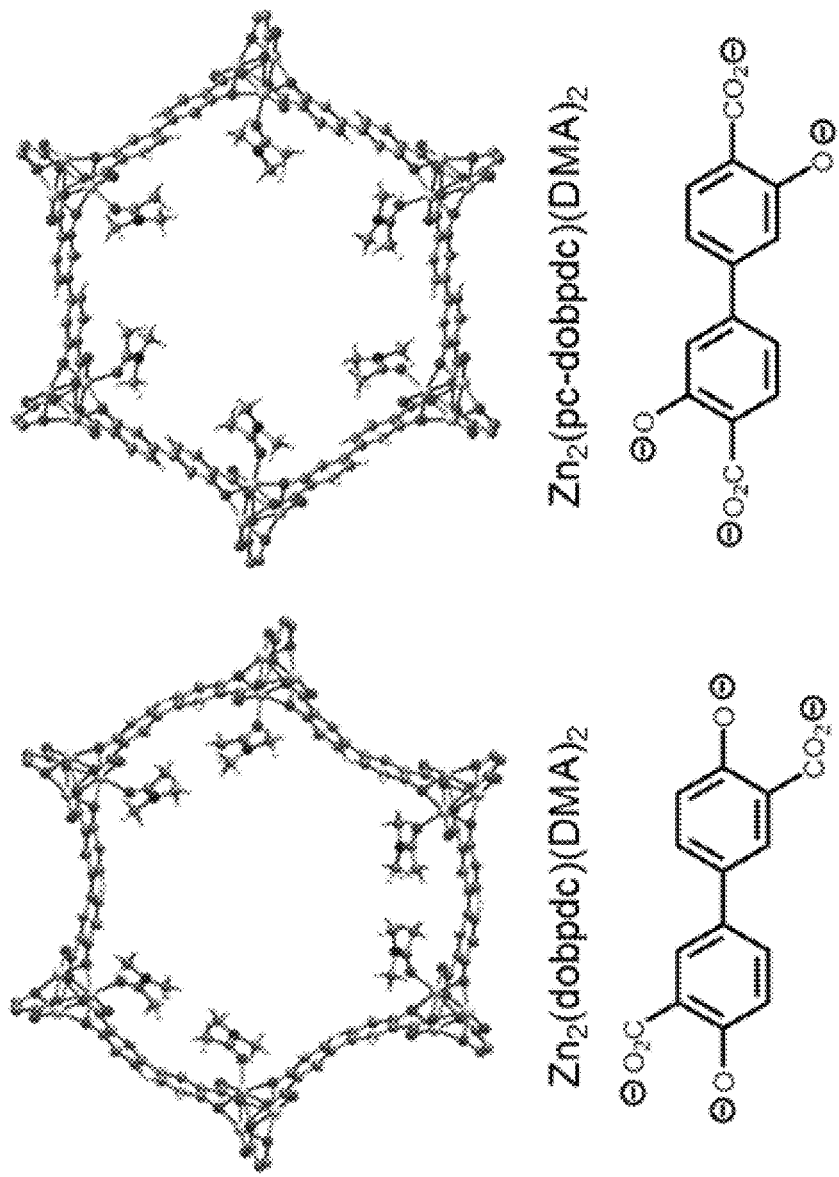
FIG. 11 illustrates single-crystal X-ray diffraction structures of $Zn_2$(dobpdc)(DMA)$_2$ (left) and $Zn_2$(pc-dobpdc)(DMA)$_2$ (right) collected at 100 K, in which the structures of the ligands are included for comparison, and DMA=N,N-dimethylacetamide, in accordance with an embodiment of the present disclosure.

We have previously reported that frameworks incorporating the isomeric ligands dobdc$^{4-}$ (2,5-dioxido-1,4-benzenedicarboxylate) and m-dobdc$^{4-}$ (2,4-dioxido-1,5-benzenedicarboxylate) possess slightly different pore architectures and gas adsorption properties. See, Kapelewski et al., 2014, *J. Am. Chem. Soc.*, 136, p. 12119. In accordance with this work, we prepared single crystals of Zn-IRMOF-74-II, or $Zn_2$(pc-dobpdc) (pc-dobpdc$^{4-}$=3,3'-dioxidobiphenyl-4,4'-dicarboxylate, pc=para-carboxylate), a recently reported framework prepared with a ligand isomeric in structure to dobpdc$^{4-}$,[16] to determine if it possesses a different pore architecture than $Zn_2$(dobpdc). Indeed, the single-crystal X-ray diffraction structure of $Zn_2$(pc-dobpdc)(DMA)$_2$ displays uniformly hexagonal channels (FIG. 11). This subtle change in framework structure is accompanied by a change from the chiral space group P3$_2$21 to the achiral space group R$\bar{3}$, which is maintained by the coplanarity of the two aromatic rings in $Zn_2$(pc-dobpdc)(DMA)$_2$, in contrast to the 38.3(2°) twist between these aromatic rings in $Zn_2$(dobpdc)(DMA)$_2$. Apart from the uniform orientation of the $Zn^{2+}$ centers in $Zn_2$(pc-dobpdc) (DMA)$_2$, the structures of $Zn_2$(pc-dobpdc)(DMA)$_2$ and $Zn_2$(dobpdc)(DMA)$_2$ are quite similar, with nearly identical unit cell lengths along the c-axis (6.719 Å for $Zn_2$(pc-dobpdc)(DMA)$_2$, 6.694 Å for $Zn_2$(dobpdc)(DMA)$_2$). Notably, the crystallographic density of $Zn_2$(pc-dobpdc)(DMA)$_2$ (1.103 g/cm$^3$) is approximately the same as that of $Zn_2$(dobpdc)(DMA)$_2$ (1.066 g/cm$^3$). Therefore, the volumetric capacities of the diamine-appended variants of these frameworks should be similar.

Based on the single-crystal X-ray diffraction structure of $Zn_2$(pc-dobpdc)(DMA)$_2$, we surmised that diamine-appended variants of $Mg_2$(pc-dobpdc) should possess more regularly spaced diamines in the a-b plane than the corresponding $Mg_2$(dobpdc) analogues, and therefore should show a single $CO_2$ adsorption step. Although the Mg analogue of $Zn_2$(pc-dobpdc) has been prepared previously (Deng et al., 2012, Science, 2012, 336, p. 1018) the reported 77 K $N_2$ BET surface area (2510 m$^2$/g) was significantly lower than that of $Mg_2$(dobpdc) (3326 m$^2$/g), (McDonald et al., 2015, Nature, 519, p. 303) which is not expected given the similar single-crystal X-ray diffraction structures of their Zn-analogues (FIG. 11). Following the published procedure but employing more thorough washing with N,N-dimethylformamide and MeOH afforded $Mg_2$(pc-dobpdc) with an increased 77 K $N_2$ BET surface area (2998±88 m$^2$/g). The expected BET surface area of $Mg_2$(pc-dobpdc) was simulated to be 2299 m$^2$/g using previously reported computational methods (See, Frost et al., 2006, J. Phys. Chem. B 110, p. 9565). This value is lower than the measured surface area (2998±88 m$^2$/g), but is also lower than the simulated surface area of $Mg_2$(dobpdc) (3037 m$^2$/g). Therefore, the lower surface area of $Mg_2$(pc-dobpdc) compared to $Mg_2$(dobpdc) is likely due to their different pore structures and not due to incomplete activation of $Mg_2$(pc-dobpdc). Using this higher surface area material, it was determined that the $\Delta h_{ads}$ of $CO_2$ adsorption in this framework is similar (−38 kJ/mol) to that of other adsorbents bearing open $Mg^{2+}$ sites. See, Drisdell et al., 2015, Phys Chem Chem Phys 17, p. 2144; and Mason et al., 2011, Energy Environ. Sci., 4, p. 3030. Therefore, the major structural difference between $Mg_2$(dobpdc) and $Mg_2$(pc-dobpdc) is the uniform distribution of $Mg^{2+}$ sites in the hexagonal channels of the latter framework.

$CO_2$ adsorption, water co-adsorption, and adsorption/desorption cycling in 1°,2°-alkylethylenediamine-appended variants of $Mg_2$(pc-dobpdc).

Figure 12A:
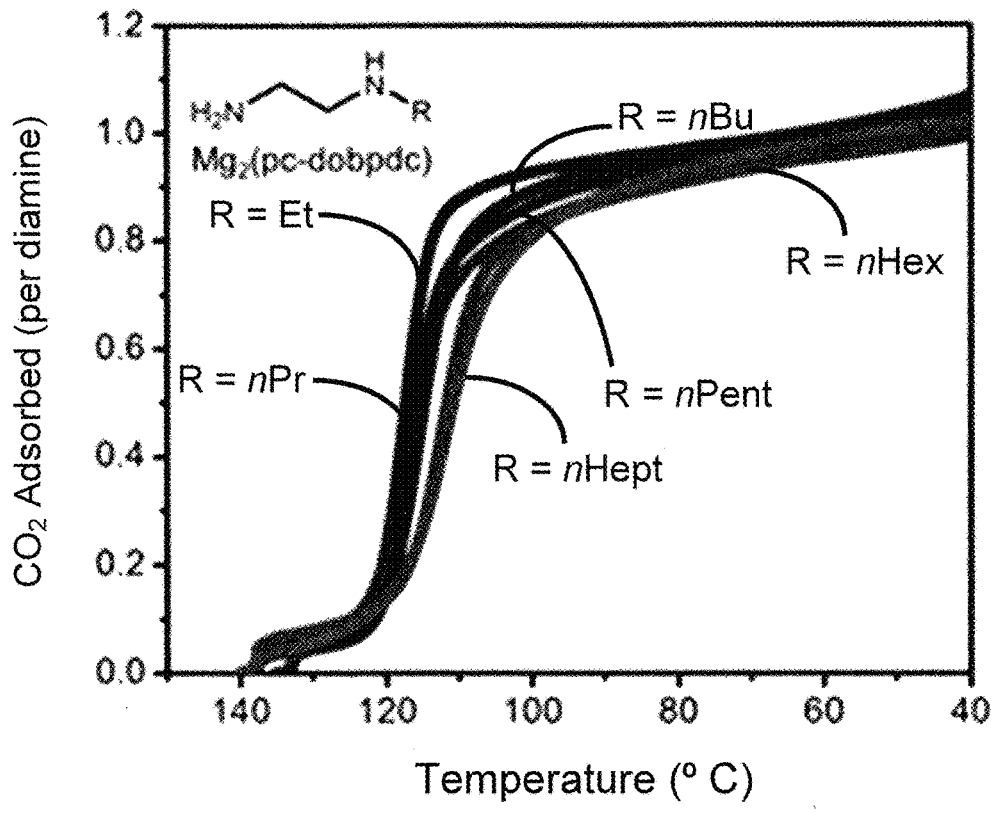
FIGS. 12A and 12B illustrate pure $CO_2$ adsorption isobars for a series of 1°,2°-alkylethylenediamine-appended variants of $Mg_2$(pc-dobpdc) bearing a) linear and b) branched alkyl groups, in accordance with an embodiment of the present disclosure.
Figure 12B:
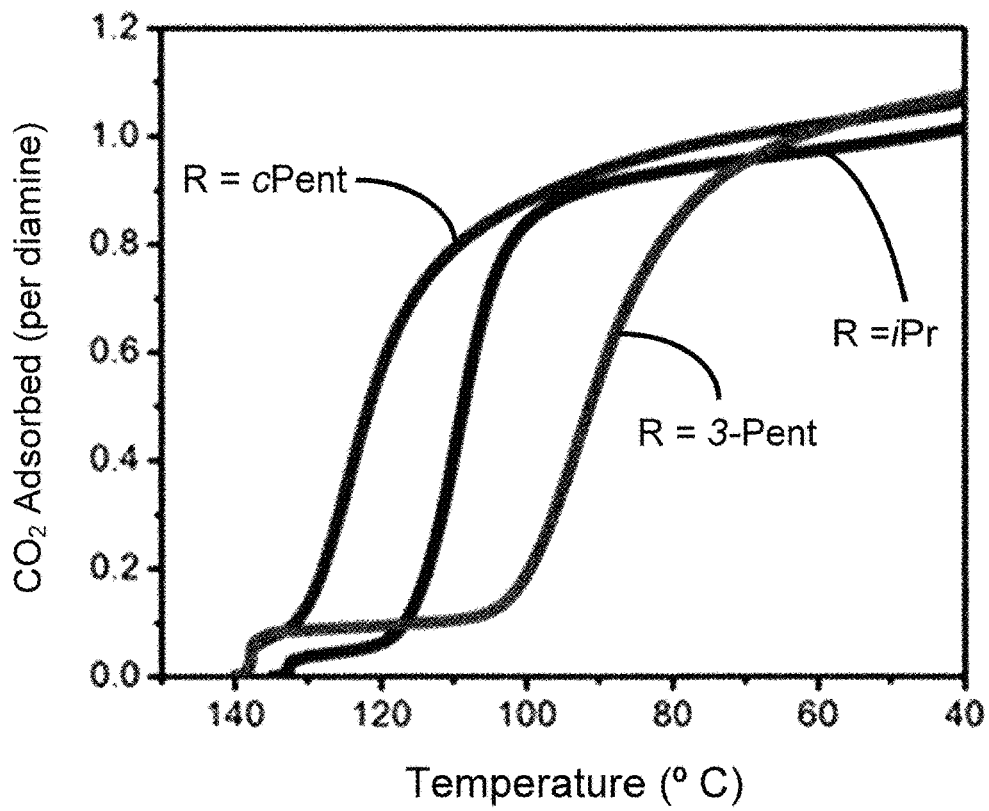

The standard procedure of exchanging the bound methanol on the $Mg^{2+}$ sites of $Mg_2$(pc-dobpdc) with 1°,2°-alkylethylenediamines was employed to prepare the corresponding diamine-appended frameworks. In most cases, high diamine loadings (>90%) could be obtained, and even with the large diamine nHept-2, a reasonably high diamine loading of 79% was reliably obtained. Remarkably, all of the linear 1°,2°-alkylethylenediamines, even nHept-2, display a single sharp $CO_2$ adsorption step upon grafting to $Mg_2$(pc-dobpdc) (FIG. 12*a*) at nearly the same temperature (inflection points of the steps: e-2: 117° C.; nPr-2=116° C.; nBu=117° C.; nPent=116° C.; nHex=112° C.; nHept=112° C.). Additionally, the 40° C. $CO_2$ adsorption isotherm of EMM-52 (nHept-2-$Mg_2$(pc-dobpdc)) confirmed the presence of a single $CO_2$ adsorption step at 0.7 mbar. Likewise, branched 1°,2°-alkylethylenediamines (FIG. 12*b*) and bulky 1°,3°-alkylethylenediamines display a single $CO_2$ adsorption step in this framework, with step temperatures comparable to those observed in $Mg_2$(dotpdc). Therefore, the subtle change in the orientation of the metal sites upon changing the framework to $Mg_2$(pc-dobpdc) completely prevents the two-step $CO_2$ adsorption/desorption profiles observed with these diamines in $Mg_2$(dobpdc). In addition, due to the minimal hysteresis observed upon $CO_2$ desorption, these adsorbents could be regenerated under pure $CO_2$ at temperatures of <140° C., with the exception of EMM-52(cPent-2) (cPent-2-$Mg_2$(pc-dobpdc)). Because of their low $CO_2$ step pressures and higher gravimetric and volumetric capacities compared to the corresponding Mg$_2$(dotpdc)-based adsorbents, these 1°,2°-alkylethylenediamine-appended variants of Mg$_2$(pc-dobpdc) are more promising adsorbents for CCS.

Figure 13:
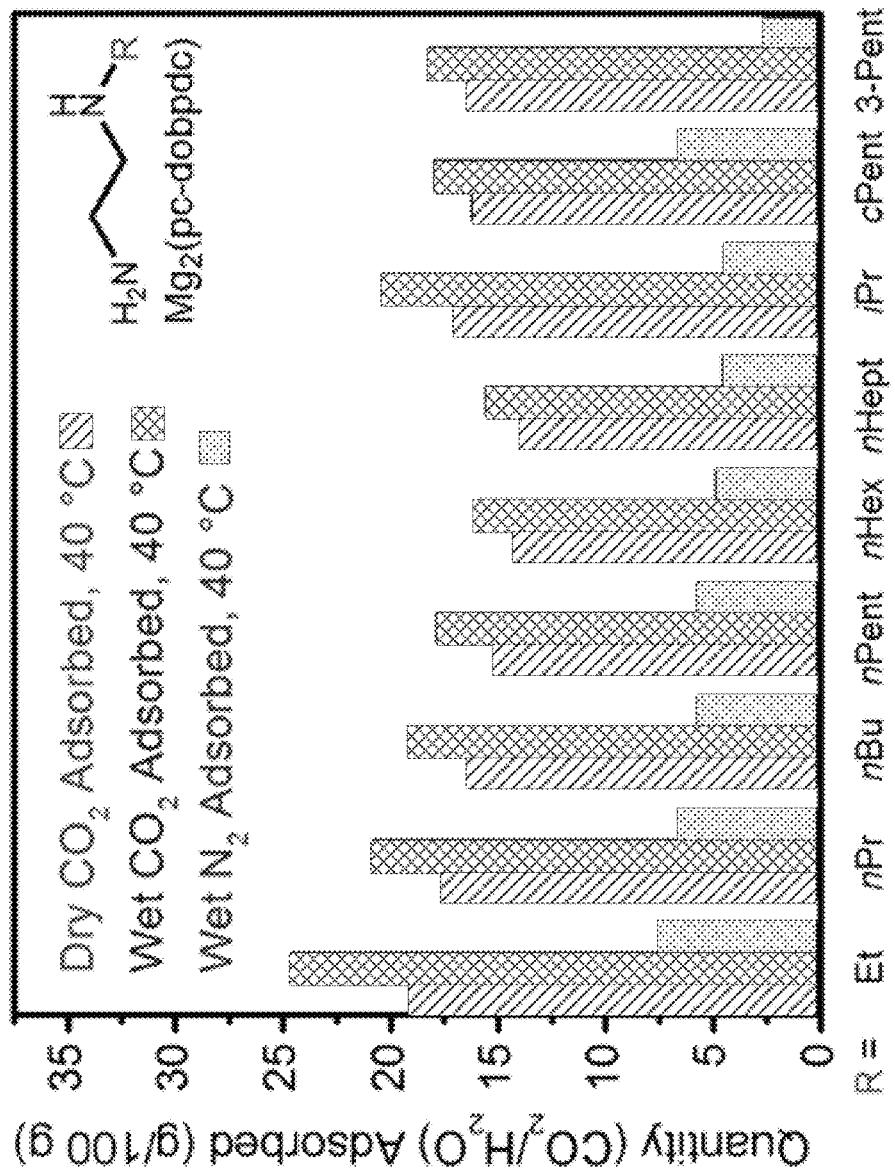
FIG. 13 provides a summary of the adsorption capacities at 40° C. for a series of 1°,2°-alkylethylenediamine-appended variants of $Mg_2$(pc-dobpdc) under dry $CO_2$, humid $CO_2$, and humid $N_2$ conditions, in accordance with an embodiment of the present disclosure.

In order to further evaluate the applicability of this family of adsorbents for CO$_2$ removal from flue gas, their performance under humid conditions was assessed by TGA. The results of these studies are summarized in FIG. 13. As with Mg$_2$(dobpdc) and Mg$_2$(dotpdc), diamine-appended variants of Mg$_2$(pc-dobpdc) display step-shaped adsorption of CO$_2$ under humid conditions at similar temperatures as under dry CO$_2$. In contrast to the results shown in FIGS. 3-4, the variant functionalized with the smallest diamine, EMM-52 (e-2) (e-2-Mg$_2$(pc-dobpdc)), exhibited the most co-adsorption of water under humid conditions in this series, on both a gravimetric (approximately 5.6 g/100 g) and molar (0.8 molecules of water per diamine) basis (FIG. 13). In addition, steadily decreasing amounts of water co-adsorption were observed in Mg$_2$(pc-dobpdc) as the linear alkyl group on the diamine became larger, leading to only 1.7 g/100 g (0.3 molecules of water per diamine) of water co-adsorption in EMM-52 (nHept-2-Mg$_2$(pc-dobpdc)). The same trend was observed with branched alkyl groups (FIG. 13). This steady decrease in the degree of water co-adsorption contrasts with the results observed with both Mg$_2$(dobpdc) and Mg$_2$(dotpdc): in the former case, more water co-adsorption was observed with larger diamines due to the presence of the second CO$_2$ adsorption step (FIG. 4), whereas in the latter case, approximately the same molar amount of water co-adsorption (0.2-0.3 molecules of water per diamine) was observed with all diamines, likely due to the increased hydrophobicity of the terphenyl framework.

Figure 14:
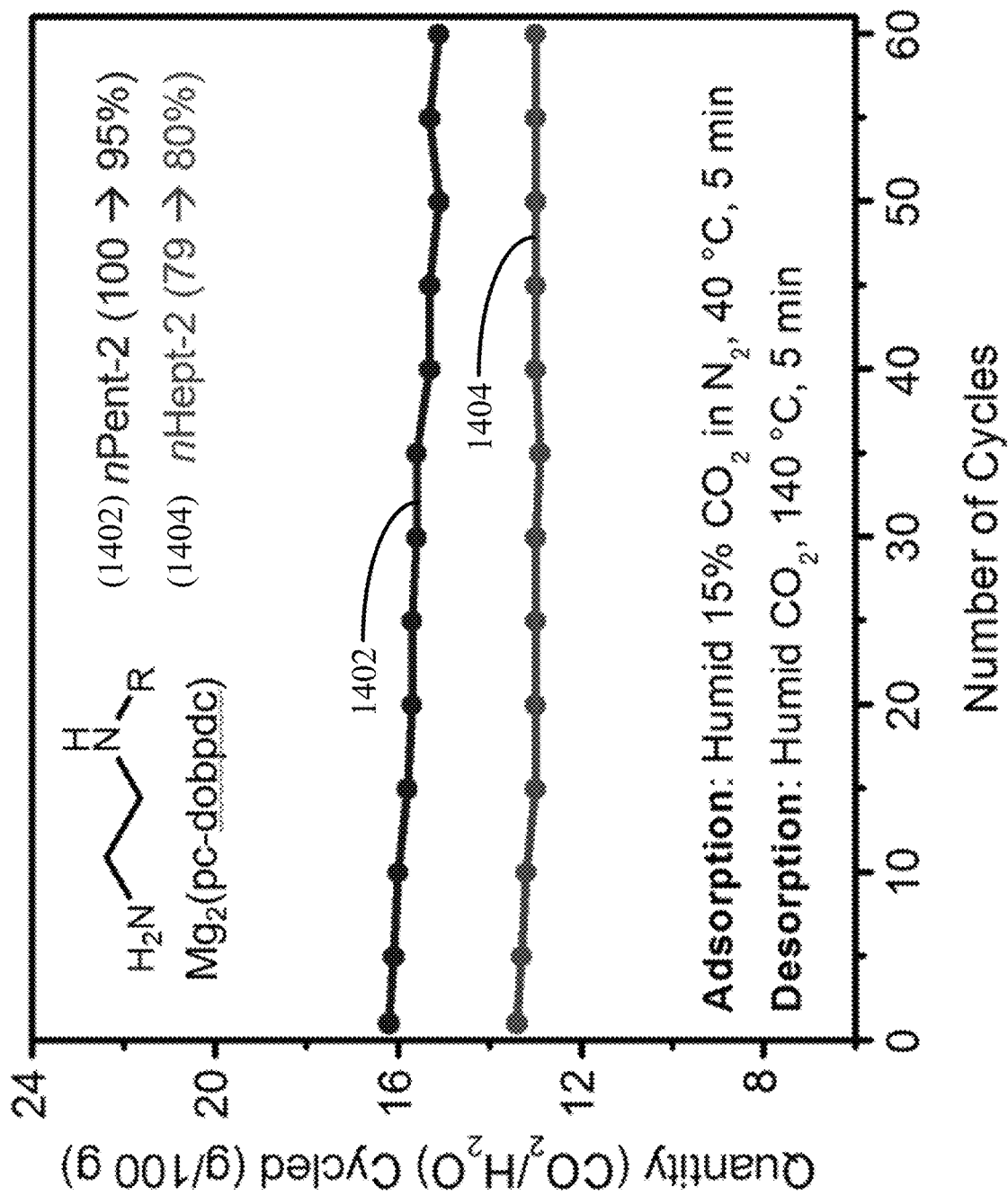
FIG. 14 illustrates cycling stability of 1°,2°-alkylethylenediamine-appended variants of $Mg_2$(pc-dobpdc) in a simulated CCS process in which the diamine loadings before and after 60 cycles are indicated in each case in the upper right corner, in accordance with an embodiment of the present disclosure.

Another potential advantage of employing diamines bearing large alkyl groups is their consistently improved cycling stabilities (FIGS. 5, 10) compared to their lower molecular weight analogues. Consistent with this trend, EMM-52 (nHept-2-Mg$_2$(pc-dobpdc)) displayed excellent thermal stability with negligible diamine loss (<1%) over 60 cycles, whereas EMM-52(nPent-2) (nPent-2-Mg$_2$(pc-dobpdc)) showed gradual diamine loss (~5%) upon cycling (FIG. 14). In addition, the cycling capacity of EMM-52 was high (~13 g/100 g), which, given the minimal amount of water co-adsorbed in humid isobaric measurements ((~1.7 g/100 g, FIG. 13), should correspond primarily to CO$_2$ (~11.3 g/100 g=2.6 mmol/g). As expected, this cycling capacity is higher than that observed for EMM-51 (nHept-2-Mg$_2$(dotpdc)) (~8.1 g/100 g=1.8 mmol/g, FIG. 10), due to the higher molecular weight of the parent framework in the latter case. Therefore, EMM-52 warrants further study for CCS applications due to its sharp CO$_2$ adsorption/desorption steps, minimal water co-adsorption under humid conditions, high thermal stability, and low CO$_2$ adsorption step pressure.

CONCLUSION

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

We claim:

1. An adsorption material, comprising:
   a metal-organic framework comprising a plurality of metal ions and a plurality of polytopic organic linkers, wherein each polytopic organic linker in the plurality of polytopic organic linkers is connected to at least two metal ions of the plurality of metal ions; and
   a plurality of ligands, wherein each respective ligand in the plurality of ligands is amine appended to at least one metal ion in the plurality of metal ions of the metal-organic framework, each respective ligand in the plurality of ligands comprising:

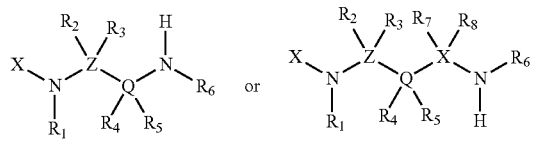

wherein,
   X is a metal ion of the metal-organic framework,
   Z is carbon, silicon, germanium, sulfur, or selenium,
   Q is carbon, silicon, germanium, sulfur, or selenium,
   R$_1$, R$_2$, R$_3$, R$_4$, R$_5$, R$_7$, and R$_8$ are each independently selected from H, halogen, substituted or unsubstituted alkyl, substituted or unsubstituted heteroalkyl, substituted or unsubstituted aryl, substituted or unsubstituted heteroaryl, or substituted or unsubstituted heterocycloalkyl, and
   R$_6$ is substituted or unsubstituted alkyl, substituted or unsubstituted heteroalkyl, substituted or unsubstituted aryl, substituted or unsubstituted heteroaryl, or substituted or unsubstituted heterocycloalkyl, wherein R6 comprises at least three non-hydrogen atoms,
   each polytopic organic linker in the plurality of polytopic organic linkers has the formula:

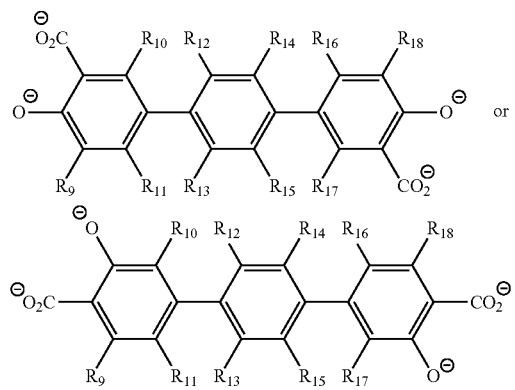

and wherein,
   R$_9$, R$_{10}$, R$_{11}$, R$_{12}$, R$_{13}$ and R$_{14}$ are each independently selected from H, halogen, hydroxyl, methyl, and halogen substituted methyl.

2. The adsorption material of claim 1, wherein each metal ion (X) in the plurality of metal ions is Mg, Ca, Mn, Cr, Fe, Co, Ni, Cu, or Zn.

3. The adsorption material of claim 1, wherein R$_6$ is substituted or unsubstituted alkyl having between three and ten carbon atoms.

4. The adsorption material of claim 1, wherein R$_6$ is an n-alkane with between three and ten carbon atoms.

5. The adsorption material of claim 4, wherein R$_6$ is propyl, butyl, pentyl, hexyl, or heptyl.

6. The adsorption material of claim 1, wherein $R_6$ is a branched-chain alkane.

7. The adsorption material of claim 1, wherein $R_6$ is a substituted or unsubstituted heterocycloalkyl.

8. The adsorption material of claim 1, wherein $R_6$ is a cycloalkane.

9. The adsorption material of claim 1, wherein $R_6$ is substituted or unsubstituted cyclopropane, cyclobutane, cylopentane, or cyclohexane.

10. The adsorption material of claim 1, wherein $R_1$ is hydrogen.

11. The adsorption material of claim 1, wherein
each respective ligand in the plurality of ligands comprises:

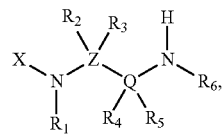

$R_2$, $R_3$, $R_4$, and $R_5$ are each hydrogen, and
Z and Q are each carbon.

12. The adsorption material of claim 1, wherein each metal ion (X) in the plurality of metal ions is Mg.

13. The adsorption material of claim 1, wherein each ligand in the plurality of ligands is N-(n-heptyl)ethylenediamine.

14. The adsorption material of claim 1, wherein the polytopic organic linker is 3,3'-dioxidobiphenyl-4,4'-dicarboxylate (para-carboxylate-dobpdc$^{4-}$).

15. The adsorption material of claim 1, wherein the adsorption material exhibits a single $CO_2$ adsorption step upon $CO_2$ adsorption.

16. The adsorption material of claim 1, wherein the adsorption material exhibits a single $CO_2$ desorption step upon $CO_2$ desorption.

17. The adsorption material of claim 1, wherein the adsorption material has a 77 K $N_2$ Brunauer-Emmett-Teller (BET) surface area of at least 3050 m$^2$/g.

18. The adsorption material of claim 1, wherein the adsorption material has a Langmuir surface area of at least 5800 m$^2$/g.

19. The adsorption material of claim 1, wherein the crystallographic density of the adsorption material is between 0.4 g/cm$^3$ and 1.2 g/cm$^3$.

20. The adsorption material of claim 1, wherein
each respective ligand in the plurality of ligands comprises:

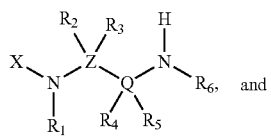

$R_6$ has a molecular weight of 44 g/mol or greater.

21. The adsorption material of claim 1, wherein
each respective ligand in the plurality of ligands comprises:

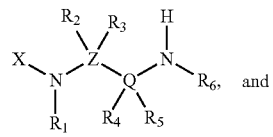

$R_6$ has a molecular weight of 58 g/mol or greater.

22. The adsorption material of claim 1, wherein
each respective ligand in the plurality of ligands comprises:

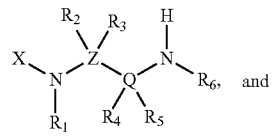

$R_6$ has a molecular weight of 72 g/mol or greater.

23. The adsorption material of claim 1, wherein
each respective ligand in the plurality of ligands comprises:

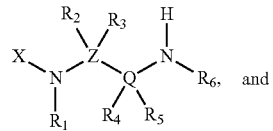

$R_6$ has a molecular weight of 86 g/mol or greater.

24. The adsorption material of claim 1, wherein
each respective ligand in the plurality of ligands comprises:

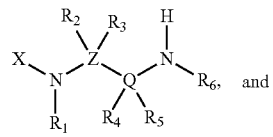

$R_6$ has a molecular weight of between 72 g/mol and 500 g/mol.

25. The adsorption material of claim 1, wherein
each respective ligand in the plurality of ligands comprises:

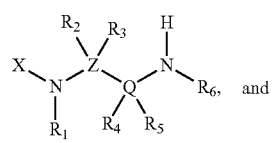

$R_6$ has a molecular weight of between 58 g/mol and 400 g/mol.

26. The adsorption material of claim 1, wherein each respective ligand in the plurality of ligands comprises:
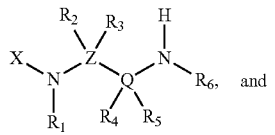
$R_6$ has a molecular weight of between 44 g/mol and 300 g/mol.
* * * * *

UNITED STATES PATENT AND TRADEMARK OFFICE
CERTIFICATE OF CORRECTION

PATENT NO. : 10,953,385 B2  
APPLICATION NO. : 16/045616  
DATED : March 23, 2021  
INVENTOR(S) : Jeffrey R. Long et al.

Page 1 of 2

It is certified that error appears in the above-identified patent and that said Letters Patent is hereby corrected as shown below:

In the Claims

In Column 26, starting at Line 37, Claim 1, please replace:

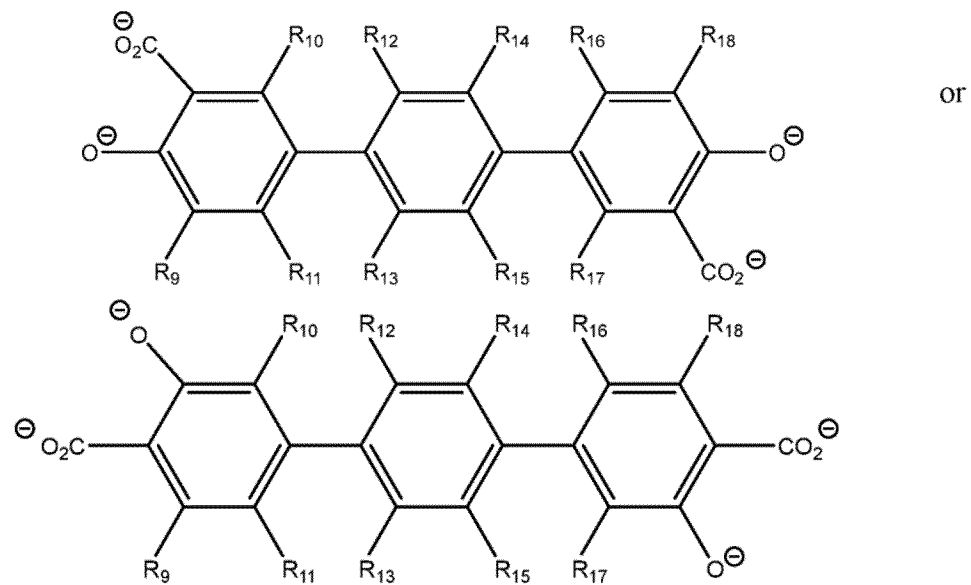 or

Signed and Sealed this  
Twenty-fifth Day of October, 2022

*Katherine Kelly Vidal*

Katherine Kelly Vidal  
*Director of the United States Patent and Trademark Office*

With:
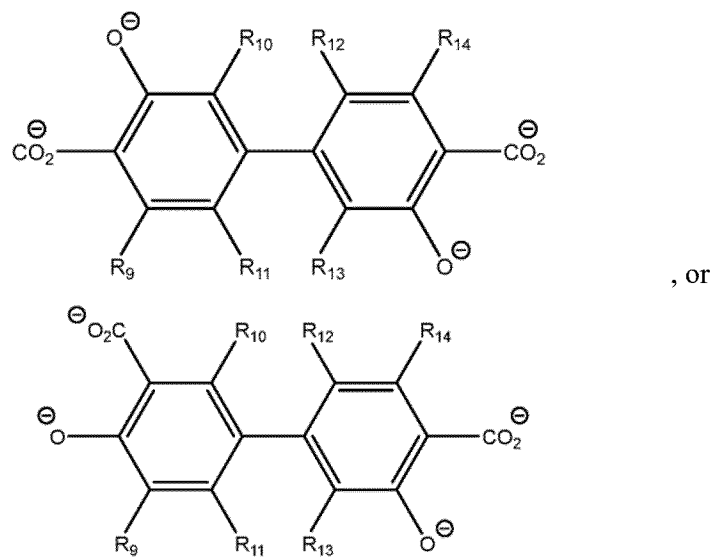
, or